US011765702B2

(12) United States Patent
Lin et al.

(10) Patent No.: US 11,765,702 B2
(45) Date of Patent: *Sep. 19, 2023

(54) WIRELESS COMMUNICATION METHOD AND DEVICE, CHIP, AND SYSTEM

(71) Applicant: GUANGDONG OPPO MOBILE TELECOMMUNICATIONS CORP., LTD., Dongguan (CN)

(72) Inventors: Yanan Lin, Dongguan (CN); Huei-Ming Lin, Victoria (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 187 days.

This patent is subject to a terminal disclaimer.

(21) Appl. No.: 17/338,659

(22) Filed: Jun. 3, 2021

(65) Prior Publication Data

US 2021/0298016 A1 Sep. 23, 2021

Related U.S. Application Data

(63) Continuation of application No. 17/013,746, filed on Sep. 7, 2020, now Pat. No. 11,051,302, which is a
(Continued)

(51) Int. Cl.
*H04W 72/0446* (2023.01)
*H04L 5/00* (2006.01)
*H04W 72/21* (2023.01)

(52) U.S. Cl.
CPC ....... *H04W 72/0446* (2013.01); *H04L 5/0055* (2013.01); *H04W 72/21* (2023.01)

(58) Field of Classification Search
CPC . H04W 72/0446; H04W 72/21; H04W 72/20; H04W 72/04; H04W 72/1268;
(Continued)

(56) References Cited

U.S. PATENT DOCUMENTS

2014/0029490 A1 1/2014 Kim et al.
2018/0027454 A1 1/2018 Martin et al.
(Continued)

FOREIGN PATENT DOCUMENTS

CN 103220070 A 7/2013
CN 106900071 A 6/2017
(Continued)

OTHER PUBLICATIONS

Ericsson, "3GPP TSG RAN WG1 Meeting #92", R1-1805698, Apr. 16-20, 2018. (From Applicant's IDS) (Year: 2018).*
(Continued)

*Primary Examiner* — Mang Hang Yeung
(74) *Attorney, Agent, or Firm* — BAYES PLLC

(57) ABSTRACT

A wireless communication method and device, a chip, and a system are provided. The method includes a terminal device determines multiple uplink channels/signals transmitted in a target time unit, the multiple uplink channels/signals being at least in part overlapped in a time domain; when the multiple uplink channels/signals fulfill a constraint condition, the terminal device multiplexes information borne in the multiple uplink channels/signals into one channel/signal in the target time unit for transmission. The constraint condition includes a first symbol of the earliest uplink channel/signal in the multiple uplink channels/signals is not before an A-th symbol later than the starting time of the target channel/signal or after the last symbol, A being a non-negative integer. By means of the constraint condition, the terminal device can determine whether to multiplex the information borne in the multiple uplink channels/signals into one channel/signal in the target time unit for transmission, and information to be transmitted can be effectively transmitted.

20 Claims, 6 Drawing Sheets

Related U.S. Application Data continuation of application No. PCT/CN2018/086059, filed on May 8, 2018.

(58) Field of Classification Search
CPC .... H04W 72/54; H04W 72/53; H04L 5/0055; H04L 1/1664; H04L 1/1861; H04L 5/0053; H04L 5/0078
USPC .......................................................... 370/336
See application file for complete search history.

(56) References Cited

U.S. PATENT DOCUMENTS

| | | | |
|---|---|---|---|
| 2019/0223205 | A1 | 7/2019 | Papasakellariou |
| 2019/0223224 | A1* | 7/2019 | Park ..................... H04W 74/006 |
| 2019/0254060 | A1* | 8/2019 | Li ........................... H04L 5/001 |

FOREIGN PATENT DOCUMENTS

| | | | |
|---|---|---|---|
| CN | 107079414 | A | 8/2017 |
| CN | 107211476 | A | 9/2017 |
| CN | 107734688 | A | 2/2018 |
| CN | 107889223 | A | 4/2018 |
| CN | 107889230 | A | 4/2018 |
| RU | 2630408 | C1 | 9/2017 |
| RU | 2653232 | C2 | 5/2018 |
| WO | 2016047994 | A1 | 3/2016 |
| WO | 2019213845 | A1 | 11/2019 |

OTHER PUBLICATIONS

Qualcomm, "Summary of DL/UL scheduling and HARQ management", R1-1805540, Apr. 16-20, 2018. (From Applicant's IDS) (Year: 2018).*

"On UCI Multiplexing on PUSCH", Source: Ericsson, Agenda Item 7.1.3.2.3, 3GPP TSG-RAN WG1 #92bis, R1-1805185, Sanya, China, Apr. 16-20, 2018, 11 pages.

"Offline Summary on CA Aspects", Samsung, Agenda item 7.1.3.4.2, 3GPP TSG RAN WG1#92, R1-1803300, Athens, Greece, Feb. 26-Mar. 2, 2018, 9 pages.

Extended European Search Report issued in corresponding European Application No. 18918115.9, dated Mar. 29, 2021, 11 pages.

First Office action issued in corresponding Chinese Application No. 202010495256.X, dated Jul. 9, 2021, 17 pages.

Notice of Priority Review of Patent Application issued in corresponding Chinese Application No. 202010495256.X, dated Jun. 16, 2021, 6 pages.

"Summary of remaining issues for UCI multiplexing on PUSCH", Agenda item: 7.1.3.2.3, Source: Qualcom, Incorporated, 3GPP TSG RAN WG1 Meeting #92bis, R1-1805666, Sanya, China, Apr. 16-20, 2018, 10 pages.

First Office action issued in corresponding Russian Application No. 2020133862, dated Aug. 26, 2021, 14 pages.

First Office action issued in corresponding Canadian Application No. 3,096,345, dated Oct. 26, 2021, 4 pages.

Notice of Reasons for Refusal issued in corresponding Japanese Patent Application No. 2020-553594, dated Jan. 28, 2022, 10 pages.

First Office action issued in corresponding India Patent Application No. 202027038758, dated Nov. 29, 2021, 6 pages.

Communication pursuant to Article 94(3) EPC issued in corresponding European Application No. 18918115.9, dated Jan. 14, 2022, 5 pages.

"Multiplexing rules for PUCCH resources with the same starting symbols", Agenda Item: 7.1.3.2.1, Source: Ericsson, 3GPP TSG RAN WG1 Meeting #92, R1-1805698, Sanya, China, Apr. 16-20, 2018, 13 pages.

"Summary of DL/UL scheduling and HARQ management", Agenda item: 7.1.3.3.2, Source: Qualcomm Incorporated, h3GPP TSG-RAN WG1 Meeting #92bis R1-1805540, Apr. 16-20, 2018, Sanya, China, 25 pages.

Extended European Search Report issued in corresponding European application No. 22202685.8, dated Nov. 3, 2022.

Ericsson, "Partially overlapped PUCCH resources", R1-1805636, 3GPP TSG RAN WG1 Meeting #92 Sanya, China, Apr. 16-20, 2018.

Huawei et al., "UCI piggyback on PUSCH for URLLC", R1-1804290, 3GPP TSG RAN WG1 Meeting #92bis Sanya, China, Apr. 16-20, 2018.

Notice of Allowance issued in corresponding Japanese application No. 2020-553594, dated Aug. 19, 2022.

3GPP TS 38.211 V16.0.0 (Dec. 2019); Technical Specification Group Radio Access Network; NR; Physical channels and modulation (Release 16).

OPPO, "Remaining details on HARQ-ACK transmission", R1-1804008, 3GPP TSG RAN WG1 Meeting #92bis Sanya, China, Apr. 16-20, 2018.

OPPO, "Discussion on PUCCH partial overlap", R1-1806836, 3GPP TSG RAN WG1 Meeting #93 Busan, Korea, May 21-25, 2018.

OPPO, "Remaining details on HARQ-ACK transmission", R1-1806838, 3GPP TSG RAN WG1 Meeting #93 Busan, Korea, May 21-25, 2018.

* cited by examiner

WIRELESS COMMUNICATION METHOD AND DEVICE, CHIP, AND SYSTEM

CROSS-REFERENCE TO RELATED APPLICATIONS

The present application is a continuation of U.S. application Ser. No. 17/013,746, filed on Sep. 7, 2020, which is a continuation of International Application No. PCT/CN2018/086059, filed on May 8, 2018, both of which are incorporated by reference in their entireties.

BACKGROUND

Implementations of the present disclosure relate to the communications field, and more specifically, to a wireless communication method, a communications device, a chip, and a system.

Currently, in a fifth-generation mobile communications technology (5th-Generation, 5G) New Radio (NR) system, sending two uplink channels simultaneously within one carrier is not supported. When a plurality of channels are transmitted within a same time unit and collide, a terminal needs to determine an actually transmitted channel to carry some or all of to-be-transmitted information. Therefore, for user equipment (UE), when a plurality of to-be-transmitted channels overlap in the time domain, how does a terminal device determine an actually transmitted channel is a problem that needs to be resolved urgently.

SUMMARY

A wireless communications method, a communications device, a chip, and a system are provided.

According to a first aspect, a wireless communications method is provided, including determining, by a terminal device, a plurality of uplink channels/signals transmitted within a target time unit, where the plurality of uplink channels/signals at least partially overlap in time domain; and multiplexing, by the terminal device when the plurality of uplink channels/signals fulfill a constraint condition, information carried in the plurality of uplink channels/signals in one channel/signal within the target time unit for transmission, where the constraint condition includes: a first symbol of an earliest uplink channel/signal of the plurality of uplink channels/signals is not before an $A^{th}$ symbol after a start time or after a last symbol of a target channel/signal, where A is a non-negative integer.

According to a second aspect, a wireless communications method is provided, including determining, by a network device, a plurality of uplink channels/signals transmitted within a target time unit, where the plurality of uplink channels/signals at least partially overlap in time domain; and receiving, by the network device when the plurality of uplink channels/signals fulfill a constraint condition, one channel/signal within the target time unit, and multiplexing information carried in the plurality of uplink channels/signals in the channel/signal for transmission. The constraint condition includes a first symbol of an earliest uplink channel/signal of the plurality of uplink channels/signals is not before an $A^{th}$ symbol after a start time or after a last symbol of a target channel/signal, where A is a non-negative integer.

According to a third aspect, a wireless communications method is provided, including receiving, by a terminal device, at least one piece of downlink control information (DCI); determining, by the terminal device, a plurality of uplink channels/signals transmitted within a target time unit, where the plurality of uplink channels/signals at least partially overlap in time domain, and the at least one piece of DCI is used for indicating at least one uplink channel/signal of the plurality of uplink channels/signals; and multiplexing, by the terminal device when the plurality of uplink channels/signals fulfill a constraint condition, information carried in the plurality of uplink channels/signals in one channel/signal within the target time unit for transmission, where the constraint condition includes: a first symbol of an earliest uplink channel/signal of the plurality of uplink channels/signals is not before an $A^{th}$ symbol after a last symbol of a physical downlink control channel (PDCCH) carrying the at least one piece of DCI, where A is a non-negative integer.

According to a fourth aspect, a wireless communications method is provided, including sending, by a network device, at least one piece of downlink control information (DCI) to a terminal device; determining, by the network device, a plurality of uplink channels/signals transmitted within a target time unit, where the plurality of uplink channels/signals at least partially overlap in time domain, and the at least one piece of DCI is used for indicating at least one uplink channel/signal of the plurality of uplink channels/signals; and receiving, by the network device when the plurality of uplink channels/signals fulfill a constraint condition, one channel/signal within the target time unit, and multiplexing information carried in the plurality of uplink channels/signals in the channel/signal for transmission, where the constraint condition includes: a first symbol of an earliest uplink channel/signal of the plurality of uplink channels/signals is not before an $A^{th}$ symbol after a last symbol of a physical downlink control channel (PDCCH) carrying the at least one piece of DCI, where A is a non-negative integer.

According to a fifth aspect, a wireless communications method is provided, including determining, by a terminal device, at least one physical uplink control channel (PUCCH) and a plurality of physical uplink shared channels (PUSCH), where the at least one PUCCH and the plurality of PUSCHs at least partially overlap in time domain; determining, by the terminal device, PUSCHs fulfilling a constraint condition in the plurality of PUSCHs; determining, by the terminal device, a target PUSCH in the PUSCHs fulfilling the constraint condition; and transmitting, by the terminal device by using the target PUSCH, uplink control information carried in the at least one PUCCH, where the constraint condition is the constraint condition in any one of the wireless communications methods in the first aspect to the fourth aspect.

According to a sixth aspect, a wireless communications method is provided, including determining, by a network device, at least one physical uplink control channel (PUCCH) and a plurality of physical uplink shared channels (PUSCH), where the at least one PUCCH and the plurality of PUSCHs at least partially overlap in time domain; determining, by the network device, PUSCHs fulfilling a constraint condition in the plurality of PUSCHs; determining, by the network device, a target PUSCH in the PUSCHs fulfilling the constraint condition; and receiving, by the network device, the target PUSCH, and multiplexing uplink control information carried in the at least one PUCCH in the target PUSCH for transmission, where the constraint condition is the constraint condition in any one of the wireless communications methods in the first aspect to the fourth aspect.

According to a seventh aspect, a wireless communications method is provided, including determining, by a terminal device, at least one physical uplink control channel (PUCCH) and a plurality of physical uplink shared channels (PUSCH), where the at least one PUCCH and the plurality of PUSCHs at least partially overlap in time domain, and the at least one PUCCH and the plurality of PUSCHs fulfill a constraint condition; determining, by the terminal device, a target PUSCH in the plurality of PUSCHs; and transmitting, by the terminal device by using the target PUSCH, uplink control information carried in the at least one PUCCH, where the constraint condition is the constraint condition in any one of the wireless communications methods in the first aspect to the fourth aspect.

According to an eighth aspect, a wireless communications method is provided, including determining, by a network device, at least one physical uplink control channel (PUCCH) and a plurality of physical uplink shared channels (PUSCH), where the at least one PUCCH and the plurality of PUSCHs at least partially overlap in time domain, and the at least one PUCCH and the plurality of PUSCHs fulfill a constraint condition; determining, by the network device, a target PUSCH in the plurality of PUSCHs; and receiving, by the network device, the target PUSCH, and multiplexing uplink control information carried in the at least one PUCCH in the target PUSCH for transmission, where the constraint condition is the constraint condition in any one of the wireless communications methods in the first aspect to the fourth aspect.

According to a ninth aspect, a communications device is provided. The communications device is configured to perform the method according to any one of the first aspect to the eighth aspect or the method according to any one of the foregoing possible implementations.

According to a tenth aspect, a communications device is provided, including a processor, configured to invoke a computer program from a memory and run the computer program, where the computer program is used for performing the method according to any one of the first aspect to the eighth aspect or the method according to any one of the foregoing possible implementations.

According to an eleventh aspect, a chip is provided. The chip is configured to perform the method according to any one of the first aspect to the eighth aspect or the method according to any one of the foregoing possible implementations.

According to a twelfth aspect, a computer-readable storage medium is provided. The storage medium is configured to store a computer program, and the computer program is used for performing the method according to any one of the first aspect to the eighth aspect or the method according to any one of the foregoing possible implementations.

According to a thirteenth aspect, a computer program product is provided. The computer program product includes a computer program instruction, and the computer program is used for performing the method according to any one of the first aspect to the eighth aspect or the method according to any one of the foregoing possible implementations.

According to a fourteenth aspect, a computer program is provided. When the computer program is run on a computer, the computer is enabled to perform the method according to any one of the first aspect to the eighth aspect or the method according to any one of the foregoing possible implementations.

According to a fifteenth aspect, a communications system is provided, including a network device and a terminal device, where the terminal device is configured to determine a plurality of uplink channels/signals transmitted within a target time unit; and multiplex, when the plurality of uplink channels/signals fulfill a constraint condition, information carried in the plurality of uplink channels/signals in one channel/signal within the target time unit for transmission. The plurality of uplink channels/signals at least partially overlap in time domain. The network device is configured to determine the plurality of uplink channels/signals; and receive one channel/signal within the target time unit when the plurality of uplink channels/signals fulfill the constraint condition, where the constraint condition includes: a first symbol of an earliest uplink channel/signal of the plurality of uplink channels/signals is not before an $A^{th}$ symbol after a start time or after a last symbol of a target channel/signal, where A is a non-negative integer.

According to a sixteenth aspect, a communications system is provided, including a network device and a terminal device, where the terminal device is configured to receive at least one piece of downlink control information (DCI); determine a plurality of uplink channels/signals transmitted within a target time unit, where the plurality of uplink channels/signals at least partially overlap in time domain, and the at least one piece of DCI is used for indicating at least one uplink channel/signal of the plurality of uplink channels/signals; and multiplex, when the plurality of uplink channels/signals fulfill a constraint condition, information carried in the plurality of uplink channels/signals in one channel/signal within the target time unit for transmission. The network device is configured to send the at least one piece of DCI to the terminal device; determine the plurality of uplink channels/signals; and receive one channel/signal within the target time unit when the plurality of uplink channels/signals fulfill the constraint condition. The constraint condition includes a first symbol of an earliest uplink channel/signal of the plurality of uplink channels/signals is not before an $A^{th}$ symbol after a last symbol of a physical downlink control channel (PDCCH) carrying the at least one piece of DCI, where A is a non-negative integer.

According to a seventeenth aspect, a communications system is provided, including a network device and a terminal device, where the terminal device is configured to determine at least one physical uplink control channel (PUCCH) and a plurality of physical uplink shared channels (PUSCH), where the at least one PUCCH and the plurality of PUSCHs at least partially overlap in time domain; determine PUSCHs fulfilling a constraint condition in the plurality of PUSCHs; determine a target PUSCH in the PUSCHs fulfilling the constraint condition; and transmit, by using the target PUSCH, uplink control information carried in the at least one PUCCH. The constraint condition is the constraint condition in any one of the wireless communications methods in the first aspect to the fourth aspect. The network device is configured to determine the at least one PUCCH and the plurality of PUSCHs, where the at least one PUCCH and the plurality of PUSCHs at least partially overlap in time domain; determine PUSCHs fulfilling a constraint condition in the plurality of PUSCHs; determine a target PUSCH in the PUSCHs fulfilling the constraint condition; and receive the target PUSCH.

According to an eighteenth aspect, a communications system is provided, including a network device and a terminal device, where the terminal device is configured to determine at least one physical uplink control channel (PUCCH) and a plurality of physical uplink shared channels (PUSCH), where the at least one PUCCH and the plurality of PUSCHs at least partially overlap in time domain, and the at least one PUCCH and the plurality of PUSCHs fulfill a constraint condition; determine a target PUSCH in the plurality of PUSCHs; and transmit, by using the target PUSCH, uplink control information carried in the at least one PUCCH. The constraint condition is the constraint condition in any one of the wireless communications methods in the first aspect to the fourth aspect. The network device is configured to determine the at least one PUCCH and the plurality of PUSCHs; determine a target PUSCH in the plurality of PUSCHs; and receive the target PUSCH.

DETAILED DESCRIPTION

The technical solutions in the implementations of the present disclosure are described clearly with reference to the accompanying drawings in the implementations of the present disclosure below.

Figure 1:
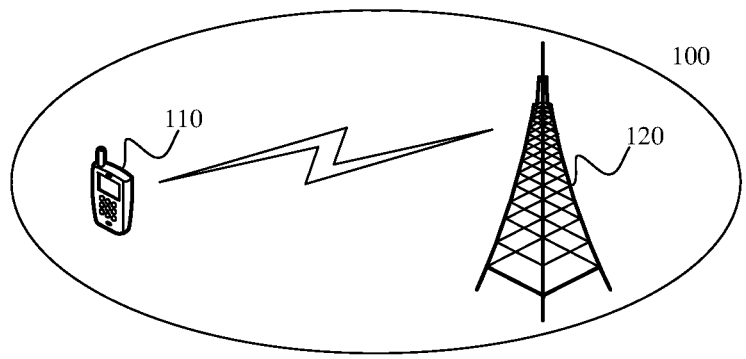
FIG. 1 shows an example of an application scenario of the present disclosure.

FIG. 1 is a schematic diagram of an application scenario according to an implementation of the present disclosure.

As shown in FIG. 1, a communications system 100 may include a terminal device 110 and a network device 120. The network device 120 may communicate with the terminal device 110 through an air interface. Multi-service transmission is supported between the terminal device 110 and the network device 120.

It should be understood that this implementation of the present disclosure is exemplarily described by using only the communications system 100, but this implementation of the present disclosure is not limited thereto. In other words, the technical solutions of the implementations of the present disclosure may be applied to various communications systems, such as a Global System for Mobile Communications (GSM), a Code Division Multiple Access (CDMA) system, a Wideband Code Division Multiple Access (WCDMA) system, a General Packet Radio Service (GPRS), a Long Term Evolution (LTE) system, an LTE Time Division Duplex (TDD) system, a Universal Mobile Telecommunications System (UMTS), a Worldwide Interoperability for Microwave Access (WiMAX) communications system, a New Radio (NR) system, and a future 5G communications system.

Using a 5G system as an example, the technical solutions of the implementations of the present disclosure may be applied to a wide-area LTE coverage mode and an NR island coverage mode. Moreover, because a large quantity of LTE is deployed below 6 GHz, frequency spectrums below 6 GHz that may be used for 5G are rare. Therefore, in NR, application of frequency spectrums above 6 GHz needs to be researched, but high frequency bands have limited coverage and quick signal fading. Moreover, to protect early investment of mobile operators in LTE, an operating mode of tight interworking between LTE and NR is proposed.

Main application scenarios of 5G include enhanced mobile broadband (eMBB), ultra-reliable and low-latency communication (URLLC), and massive machine type communication (mMTC). The eMBB aims to obtain multimedia content, services, and data for a user, and requirements for the eMBB are increased very quickly. The eMBB may be deployed in different scenarios, for example, an indoor scenario, a city scenario, and a countryside scenario, and differences between capabilities and between requirements of the eMBB are relatively large. Therefore, the eMBB cannot be treated as the same and may be analyzed in detail with reference to specific deployment scenarios. Typical applications of the URLLC include industrial automation, power automation, remote medical operations (surgeries), traffic safety guarantee, and the like. The mMTC is typically characterized by including a high connection density, a small data volume, a delay-insensitive service, low costs and long service lives of modules, and the like.

In the communications system 100 shown in FIG. 1, the network device 120 may be an access network device communicating with the terminal device 110. The access network device may provide communications coverage to a particular geographic area and may communicate with the terminal device 110 (for example, UE) located within the coverage area.

For example, the access network device may be a base transceiver station (BTS) in a Global System for Mobile communications (GSM) system or Code Division Multiple Access (CDMA), or may be a NodeB (NB) in a Wideband Code Division Multiple Access (WCDMA) system, or may be an evolved NodeB (eNB or eNodeB) in a Long Term Evolution (LTE) system.

In at least one implementation, the access network device may be a next-generation radio access network (NG RAN), a base station (gNB) in an NR system, or a wireless controller in a cloud radio access network (CRAN), or the access network device may be a relay station, an access point, an in-vehicle device, a wearable device, a network device in a future evolved public land mobile network (PLMN), or the like.

The terminal device 110 may be any terminal device. The terminal device 110 may communicate with one or more core networks through a radio access network (RAN), and may also be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus.

For example, the terminal device may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal device in a 5G network.

It should be understood that terms "system" and "network" in this specification are usually interchangeably used in this specification.

Figure 2:
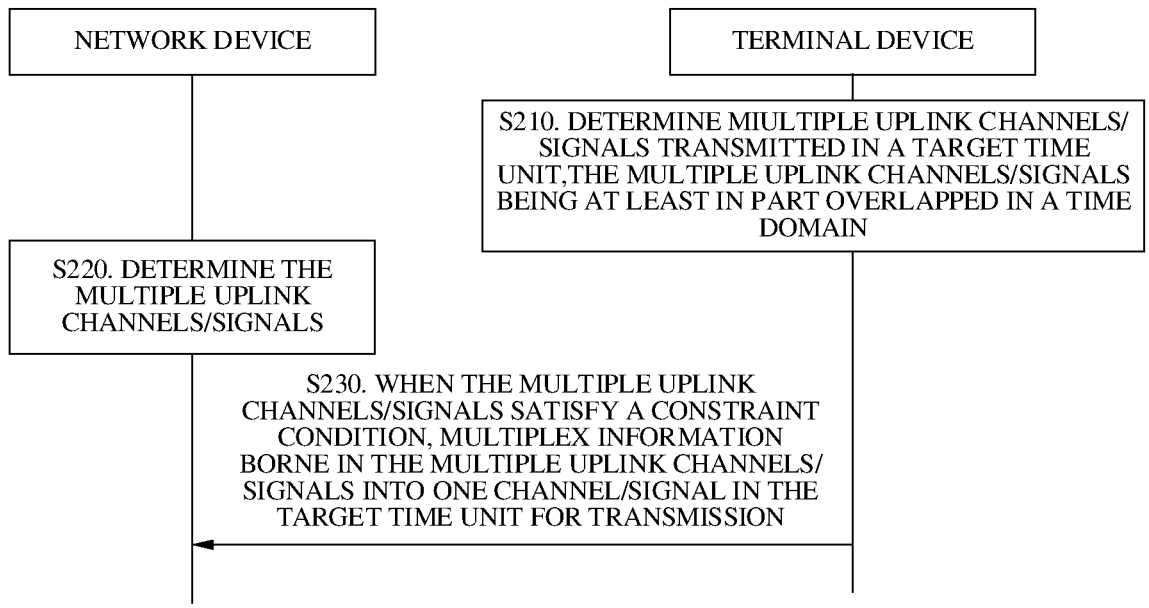
FIG. 2 is a schematic flowchart of a wireless communications method according to an implementation of the present disclosure.

FIG. 2 is a schematic flowchart of a wireless communications method 200 according to an implementation of the present disclosure. A terminal device shown in FIG. 2 may be a terminal device shown in FIG. 1, and a network device shown in FIG. 2 may be an access network device shown in FIG. 1. The method 200 includes some or all of the following content.

As shown in FIG. 2, the method 200 includes the following steps.

S210. A terminal device determines a plurality of uplink channels/signals transmitted within a target time unit, where the plurality of uplink channels/signals at least partially overlap in the time domain.

S220. A network device determines the plurality of uplink channels/signals.

S230. The terminal device multiplexes, when the plurality of uplink channels/signals fulfill a constraint condition, information carried in the plurality of uplink channels/signals in one channel/signal within the target time unit for transmission.

The constraint condition includes a first symbol of an earliest uplink channel/signal of the plurality of uplink channels/signals is not before an $A^{th}$ symbol after a start time or after a last symbol of a target channel/signal, where A is a non-negative integer.

The target time unit in this implementation of the present disclosure may be understood as a resource granularity of a time domain resource. For example, the target time unit includes but is not limited to: a slot, a subframe, a frame, and a transmission time unit.

In at least one implementation, $A=N2+1$, where N2 is a preparation time of a PUSCH.

In at least one implementation, $A=N2+d_{2,1}$, where N2 is a preparation time of a PUSCH.

In at least one implementation, a value of $d_{2,1}$ is related to a demodulation reference signal (DMRS) structure in a PUSCH. For example, only when a first time domain symbol in a PUSCH includes a DMRS, $d_{2,1}=0$; otherwise $d_{2,1}=1$.

In at least one implementation, the constraint condition further includes a start time of the earliest uplink channel/signal of the plurality of uplink channels/signals is not before a $B^{th}$ symbol after the last symbol of the target channel/signal, where B is a non-negative integer.

In at least one implementation, $B=N2+d_{1,1}+d_{1,2}$, where N1 is a processing time of a PDSCH.

In at least one implementation, $B=N1+1+d_{1,2}$, where N1 is a processing time of a physical downlink shared channel (PDSCH).

In at least one implementation, a value of $d_{1,1}$ is related to a corresponding ACK/NACK transmission manner. For example, when corresponding ACK/NACK is transmitted by using a PUCCH, $d_{1,1}=0$; or when corresponding ACK/NACK is transmitted by using a PUSCH, $d_{1,1}=1$.

In at least one implementation, a value of $d_{1,2}$ is related to a PDSCH mapping manner. For example, if a PDSCH mapping manner is of the mapping type A stipulated according to the section 7.4.1.1 of the 3GPP technical specification (TS) 38.211, and a last symbol of a PDSCH is an $i^{th}$ symbol of a slot less than 7, $d_{1,2}=7-i$. For another example, if a PDSCH mapping manner is of the mapping type B stipulated according to the section 7.4.1.1 of the 3GPP technical specification (TS) 38.211, and a quantity of symbols of an allocated PDSCH is 4, $d_{1,2}=3$. For another example, if a PDSCH mapping manner is of the mapping type B stipulated according to the section 7.4.1.1 of the 3GPP technical specification (TS) 38.211, and a quantity of symbols of an allocated PDSCH is 2, $d_{1,2}=3+d$, where d is a quantity of overlapping symbols of a scheduled PDCCH and the allocated PDSCH. For another example, if a PDSCH mapping manner is neither of the foregoing mapping type A nor of the foregoing mapping type B, $d_{1,2}=0$.

In at least one implementation, each uplink channel/signal of the plurality of uplink channels/signals is a periodic uplink channel/signal.

In at least one implementation, the uplink channels/signals include a semi-persistent scheduled PUSCH (SPS PUSCH); a physical uplink control channel (PUCCH) for carrying acknowledgment/negative-acknowledgment (ACK/NACK) corresponding to a semi-persistent scheduled physical downlink shared channel (SPS-PDSCH); a physical uplink control channel (PUCCH) for carrying periodic channel state information (P-CSI); a physical uplink control channel (PUCCH) for carrying semi-persistent scheduled channel state information (SPS-CSI); a physical uplink shared channel (PUSCH) for carrying semi-persistent scheduled channel state information (SPS-CSI); and a physical uplink control channel (PUCCH) for carrying a scheduling request (SR).

In this implementation of the present disclosure, when the plurality of uplink channels/signals transmitted within the target time unit at least partially overlap in the time domain, the constraint condition enables the terminal device to determine whether to multiplex the information carried in the plurality of uplink channels/signals in one channel/signal within the target time unit for transmission, which can effectively transmit to-be-transmitted information.

In at least one implementation, in this implementation of the present disclosure, specific content of the foregoing constraint condition may be determined according to specific types of the plurality of uplink channels/signals.

The constraint condition in this implementation of the present disclosure is described below with reference to accompanying drawings and specific scenarios.

Figure 3:
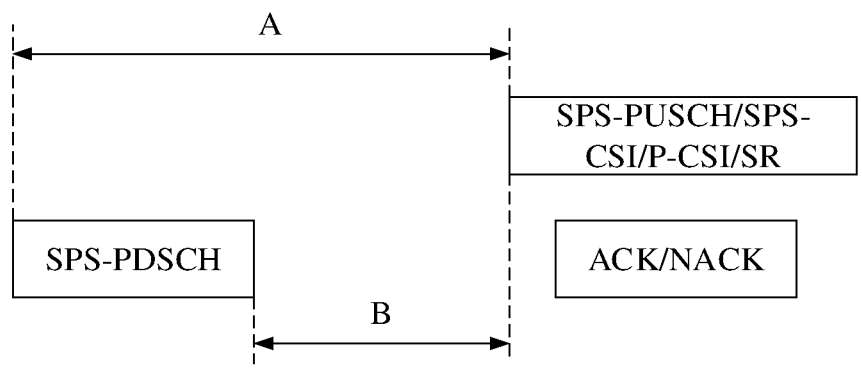
FIG. 3 to FIG. 5 are schematic block diagrams of a constraint condition according to an implementation of the present disclosure.

In an implementation, the plurality of uplink channels/signals may include at least one physical uplink control channel (PUCCH) used for carrying acknowledgment/negative-acknowledgment (ACK/NACK) corresponding to a semi-persistent scheduled physical downlink shared channel (SPS-PDSCH); and the target channel/signal is a last SPS-PDSCH of SPS-PDSCHs corresponding to the at least one PUCCH. That a first symbol of an earliest uplink channel/signal of the plurality of uplink channels/signals is not before an $A^{th}$ symbol after a start time of a target channel/signal is exemplarily described below with reference to FIG. 3 by using an example in which the plurality of uplink channels/signals include a PUCCH used for carrying ACK/NACK corresponding to an SPS-PDSCH:

As shown in FIG. 3, the plurality of uplink channels include a PUCCH used for carrying ACK/NACK corresponding to an SPS-PDSCH and an uplink channel/signal used for carrying SPS-PUSCH/SPS-CSI/P-CSI/SR. The uplink channel/signal used for carrying SPS-PUSCH/SPS-CSI/P-CSI/SR may be any one of an SPS PUSCH, a PUCCH for carrying ACK/NACK corresponding to an SPS-PDSCH, a PUCCH for carrying P-CSI, a PUCCH for carrying SPS-CSI, a PUSCH for carrying SPS-CSI, and a PUCCH for carrying an SR.

As shown in FIG. 3, the uplink channel/signal used for carrying SPS-PUSCH/SPS-CSI/P-CSI/SR is before the PUCCH used for carrying ACK/NACK corresponding to an SPS-PDSCH. Therefore, the terminal device may determine whether the constraint condition is satisfied between the PUCCH used for carrying ACK/NACK corresponding to an SPS-PDSCH and the SPS-PDSCH, and multiplex, in one channel/signal when determining that the constraint condition is satisfied between the PUCCH used for carrying ACK/NACK corresponding to an SPS-PDSCH and the SPS-PDSCH, the uplink channel/signal used for carrying SPS-PUSCH/SPS-CSI/P-CSI/SR and the PUCCH used for carrying ACK/NACK corresponding to an SPS-PDSCH for transmission. The channel/signal may be either of the uplink channel/signal used for carrying SPS-PUSCH/SPS-CSI/P-CSI/SR and the PUCCH used for carrying ACK/NACK corresponding to an SPS-PDSCH, or may select, according to, for example, a determining criterion, one of the uplink channel/signal used for carrying SPS-PUSCH/SPS-CSI/P-CSI/SR and the PUCCH used for carrying ACK/NACK corresponding to an SPS-PDSCH to perform multiplexing.

As shown in FIG. 3, a first symbol of the uplink channel/signal used for carrying SPS-PUSCH/SPS-CSI/P-CSI/SR is not before an $A^{th}$ symbol after a start time of an SPS-PDSCH, where A is a non-negative integer; and a start time of the uplink channel/signal used for carrying SPS-PUSCH/SPS-CSI/P-CSI/SR is not before a $B^{th}$ symbol after a last symbol of the SPS-PDSCH, where B is a non-negative integer. Therefore, it may be determined that the constraint condition is satisfied between the PUCCH used for carrying ACK/NACK corresponding to an SPS-PDSCH and the SPS-PDSCH.

It should be understood that a block diagram shown in FIG. 3 in which a plurality of uplink channels/signals partially overlap in the time domain is only an example. In other alternative implementations, the plurality of uplink channels/signals may further include periodic uplink signals of other types, and the plurality of uplink channels/signals may alternatively include a plurality of SPS-PDSCHs.

Figure 4:
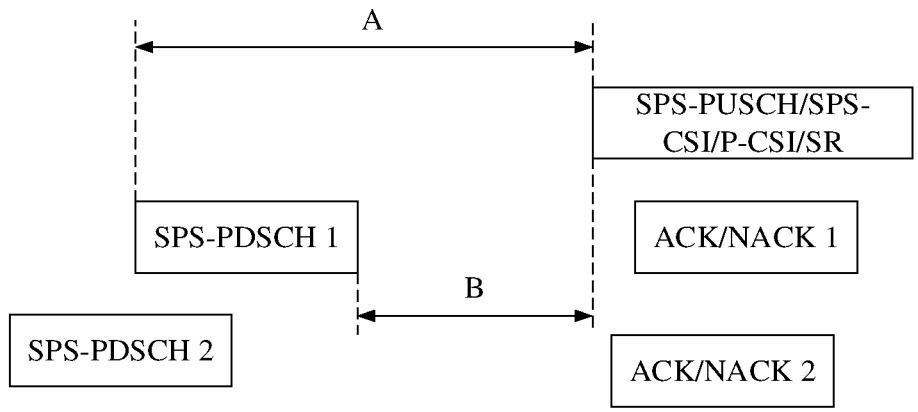

For example, as shown in FIG. 4, the plurality of uplink channels/signals may include: a PUCCH used for carrying ACK/NACK 1 corresponding to an SPS-PDSCH 1 and a PUCCH used for carrying ACK/NACK 2 corresponding to an SPS-PDSCH 2. In this case, the target channel/signal in this implementation of the present disclosure may be a last SPS-PDSCH of SPS-PDSCHs corresponding to the at least one PUCCH, that is, the SPS-PDSCH 1.

In another implementation, the plurality of uplink channels/signals include no PUCCH used for carrying ACK/NACK corresponding to an SPS-PDSCH; and the target channel/signal is a last uplink channel/signal of the plurality of uplink channels/signals sent before the target time unit.

Figure 5:
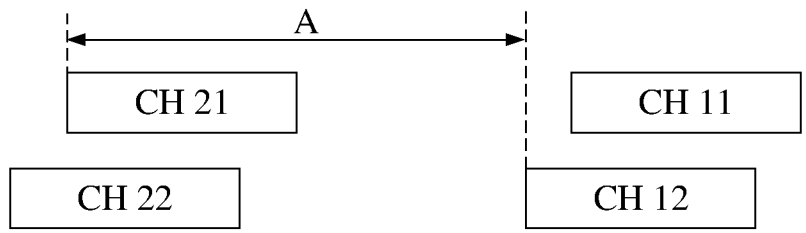

For example, as shown in FIG. 5, the plurality of uplink channels/signals may include a first periodic uplink channel/signal (CH 11) and a second periodic uplink channel/signal (CH 12), where the first periodic uplink channel/signal and the second periodic uplink channel/signal may be uplink channels/signals used for carrying SPS-PUSCH/SPS-CSI/P-CSI/SR. Within the target time unit, the second periodic uplink channel/signal is before the first periodic uplink channel/signal, and a last uplink channel/signal of the plurality of uplink channels/signals (a CH 21 and a CH 22 shown in FIG. 5) sent before the target time unit is the first periodic uplink channel/signal (CH 21). Therefore, whether to multiplex information carried in the CH 12 and the CH 11 in one uplink channel/signal for transmission may be determined by determining whether the constraint condition is satisfied between the CH 12 and the CH 21.

As shown in FIG. 5, a first symbol of the CH 12 is not before an $A^{th}$ symbol after a start time of the CH 21, where A is a non-negative integer. Therefore, it may be determined that the constraint condition is satisfied between the CH 12 and the CH 21, and information carried in the CH 12, and the CH 21 may be multiplexed in one uplink channel/signal and transmitted.

It should be understood that the CH 21 shown in FIG. 5 is the CH 11 sent by the terminal device before the target time unit, and the CH 22 shown in FIG. 5 is the CH 12 sent by the terminal device before the target time unit. This implementation of the present disclosure aims to indicate that the CH 21 and the CH 11 belong to a same periodic uplink channel/signal but does not limit specific content between the CH 21 and the CH 11. For example, the content of the CH 21 and content of the CH 11 may be the same or different. Correspondingly, the content of the CH 22 and content of the CH 12 may be the same or different.

It should be further understood that the terminal device in this implementation of the present disclosure may determine, based on whether a plurality of uplink channels/signals within a target time unit fulfill a constraint condition, that information carried in the plurality of uplink channels/signals is multiplexed in one uplink channel/signal within the target time unit and transmitted, but this implementation of the present disclosure does not limit an uplink channel/signal, within the target time unit, in which the information is specifically multiplexed and a specific operation that is performed when the plurality of uplink channels/signals do not fulfill the constraint condition.

A specific operation performed by the terminal device when the plurality of uplink channels/signals do not fulfill the constraint condition is exemplarily described below.

As an example, if the plurality of uplink channels/signals may include at least one physical uplink control channel (PUCCH) used for carrying acknowledgment/negative-acknowledgment (ACK/NACK) corresponding to a semi-persistent scheduled physical downlink shared channel (SPS-PDSCH), the terminal device transmits, when determining that the plurality of uplink channels/signals do not fulfill the constraint condition, a PUCCH of the at least one PUCCH. As another example, the terminal device determines, when determining that the plurality of uplink channels/signals do not fulfill the constraint condition, that the plurality of uplink channels/signals to be transmitted within the target time unit are in error. As another example, the terminal device transmits, when determining that the plurality of uplink channels/signals do not fulfill the constraint condition, the earliest uplink channel/signal of the plurality of uplink channels/signals.

A wireless communications method according to an implementation of the present disclosure is described above in detail from the perspective of the terminal device with reference to FIG. 2 to FIG. 5, but the implementations of the present disclosure are not limited thereto. As shown in FIG. 2, the method of this implementation of the present disclosure may also be applied to a network device. Correspondingly, the network device determines the plurality of uplink channels/signals; and when the plurality of uplink channels/signals fulfill the constraint condition, the network device receives one uplink channel/signal within the target time unit.

Specifically, the network device determines a plurality of uplink channels/signals transmitted within a target time unit, where the plurality of uplink channels/signals at least partially overlap in the time domain; and the network device receives, when the plurality of uplink channels/signals fulfill a constraint condition, one channel/signal within the target time unit, and multiplexing information carried in the plurality of uplink channels/signals in the channel/signal for transmission, where the constraint condition includes a first symbol of an earliest uplink channel/signal of the plurality of uplink channels/signals is not before an $A^{th}$ symbol after a start time or after a last symbol of a target channel/signal, where A is a non-negative integer.

In at least one implementation, A=N2+1, where N2 is a preparation time of a PUSCH.

In at least one implementation, $A=N2+d_{2,1}$, where N2 is a preparation time of a PUSCH.

In at least one implementation, a value of $d_{2,1}$ is related to a demodulation reference signal (DMRS) structure in a PUSCH. For example, only when a first time domain symbol in a PUSCH includes a DMRS, $d_{2,1}=0$; otherwise $d_{2,1}=1$.

In at least one implementation, the constraint condition further includes a start time of the earliest uplink channel/signal of the plurality of uplink channels/signals is not before a $B^{th}$ symbol after the last symbol of the target channel/signal, where B is a non-negative integer.

In at least one implementation, $B=N1+1+d_{1,2}$, where N1 is a processing time of a PDSCH.

In at least one implementation, $B=N2+d_{1,1}+d_{1,2}$, where N1 is a processing time of a PDSCH.

In at least one implementation, a value of $d_{1,1}$ is related to a corresponding ACK/NACK transmission manner. For example, when corresponding ACK/NACK is transmitted by using a PUCCH, $d_{1,1}=0$; or when corresponding ACK/NACK is transmitted by using a PUSCH, $d_{1,1}=1$.

In at least one implementation, a value of $d_{1,2}$ is related to a PDSCH mapping manner. For example, if a PDSCH mapping manner is of the mapping type A stipulated according to the section 7.4.1.1 of the 3GPP technical specification (TS) 38.211, and a last symbol of a PDSCH is an $i^{th}$ symbol of a slot less than 7, $d_{1,2}=7-i$. For another example, if a PDSCH mapping manner is of the mapping type B stipulated according to the section 7.4.1.1 of the 3GPP technical specification (TS) 38.211, and a quantity of symbols of an allocated PDSCH is 4, $d_{1,2}=3$. For another example, if a PDSCH mapping manner is of the mapping type B stipulated according to the section 7.4.1.1 of the 3GPP technical specification (TS) 38.211, and a quantity of symbols of an allocated PDSCH is 2, $d_{1,2}=3+d$, where d is a quantity of overlapping symbols of a scheduled PDCCH and the allocated PDSCH. For another example, if a PDSCH mapping manner is neither of the foregoing mapping type A nor of the foregoing mapping type B, $d_{1,2}=0$.

In at least one implementation, each uplink channel/signal of the plurality of uplink channels/signals is a periodic uplink channel/signal.

In at least one implementation, the plurality of uplink channels/signals include at least one PUCCH used for carrying ACK/NACK corresponding to an SPS-PDSCH; and the target channel/signal is a last SPS-PDSCH of SPS-PDSCHs corresponding to the at least one PUCCH.

In at least one implementation, the plurality of uplink channels/signals include no PUCCH used for carrying ACK/NACK corresponding to an SPS-PDSCH; and the target channel/signal is a last uplink channel/signal of the plurality of uplink channels/signals received before the target time unit.

In at least one implementation, the method further includes receiving, by the network device, when determining that the plurality of uplink channels/signals do not fulfill the constraint condition, a PUCCH of the at least one PUCCH.

In at least one implementation, the method further includes determining, by the network device, when determining that the plurality of uplink channels/signals do not fulfill the constraint condition, that the plurality of uplink channels/signals to be transmitted within the target time unit are in error.

In at least one implementation, the method further includes: receiving, by the network device, when determining that the plurality of uplink channels/signals do not fulfill the constraint condition, the earliest uplink channel/signal of the plurality of uplink channels/signals.

In at least one implementation, the uplink channels/signals include a semi-persistent scheduled PUSCH (SPS PUSCH); a physical uplink control channel (PUCCH) for carrying acknowledgment/negative-acknowledgment (ACK/NACK) corresponding to a semi-persistent scheduled physical downlink shared channel (SPS-PDSCH); a physical uplink control channel (PUCCH) for carrying periodic channel state information (P-CSI); a physical uplink control channel (PUCCH) for carrying semi-persistent scheduled channel state information (SPS-CSI); a physical uplink shared channel (PUSCH) for carrying semi-persistent scheduled channel state information (SPS-CSI); and a physical uplink control channel (PUCCH) for carrying a scheduling request (SR).

It should be understood that, for steps of a wireless communications method performed by the network device, refer to corresponding steps in the method 200 shown in FIG. 2; and for a determining method for determining, by the network device, whether the plurality of uplink channels/signals fulfill the constraint condition, refer to a corresponding implementation on the foregoing terminal device side. For brevity, details are not described herein again.

Figure 6:
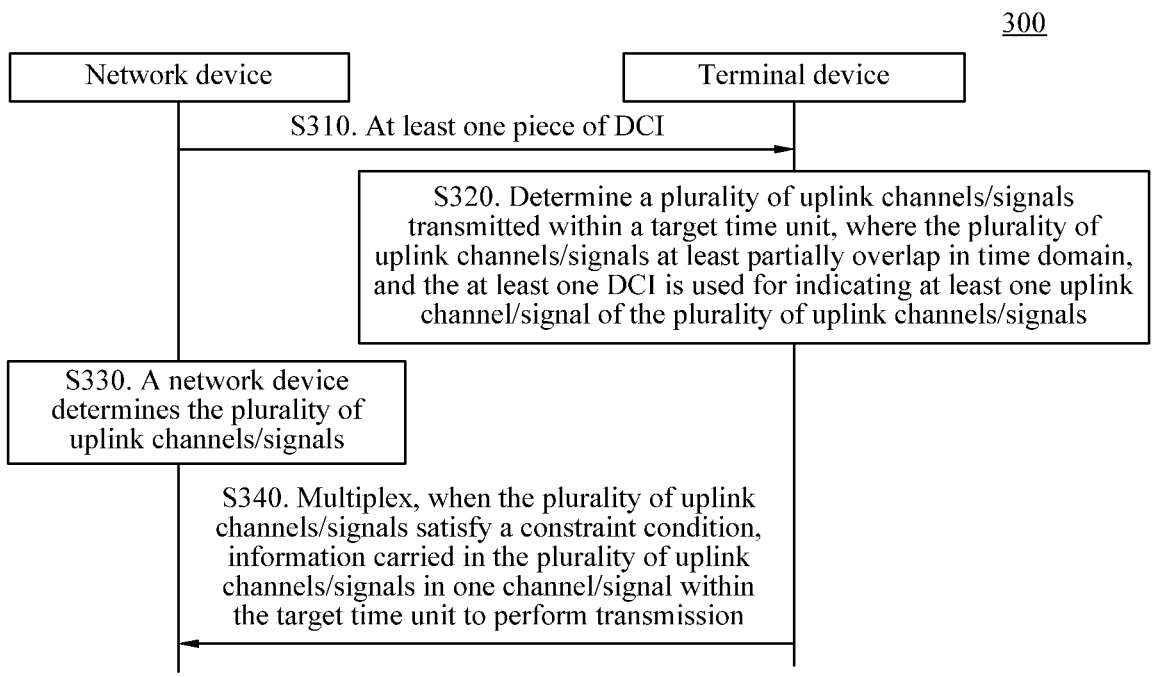
FIG. 6 is another schematic flowchart of a wireless communications method according to an implementation of the present disclosure.

FIG. 6 is a schematic flowchart of a wireless communications method 300 according to an implementation of the present disclosure. A terminal device shown in FIG. 6 may be a terminal device shown in FIG. 1, and a network device shown in FIG. 6 may be an access network device shown in FIG. 1. The method 300 includes some or all of the following content.

As shown in FIG. 6, the method 300 includes the following steps.

S310. A terminal device receives at least one piece of downlink control information (DCI) sent by a network device.

S320. The terminal device determines a plurality of uplink channels/signals transmitted within a target time unit, where the plurality of uplink channels/signals at least partially overlap in the time domain, and the at least one piece of DCI is used for indicating at least one uplink channel/signal of the plurality of uplink channels/signals.

S330. The network device determines the plurality of uplink channels/signals.

S340. The terminal device multiplexes, when the plurality of uplink channels/signals fulfill a constraint condition, information carried in the plurality of uplink channels/signals in one channel/signal within the target time unit for transmission.

The constraint condition includes: the first symbol of the earliest uplink channel/signal of the plurality of uplink channels/signals is not before an $A^{th}$ symbol after a last symbol of a PDCCH carrying the at least one piece of DCI, where A is a non-negative integer.

In at least one implementation, A=N2+1, where N2 is a preparation time of scheduling a physical uplink shared channel (PUSCH).

In at least one implementation, A=N2+$d_{2,1}$, where N2 is a preparation time of a PUSCH.

In at least one implementation, a value of $d_{2,1}$ is related to a demodulation reference signal (DMRS) structure in a PUSCH. For example, only when a first time domain symbol in a PUSCH includes a DMRS, $D_{2,1}$=0; otherwise $d_{2,1}$=1.

In an implementation, the plurality of uplink channels/signals include at least one PUCCH for carrying ACK/NACK corresponding to a target PDSCH; and the constraint condition further includes: the first symbol of the earliest uplink channel/signal of the plurality of uplink channels/signals is not before a $B^{th}$ symbol after a last symbol of the at least one target PDSCH, where B is a non-negative integer.

In at least one implementation, B=N1+1+$d_{1,2}$, where N1 is a processing time of a PDSCH.

In at least one implementation, B=N2+$d_{1,1}$+$d_{1,2}$, where N1 is a processing time of a PDSCH.

In at least one implementation, a value of $d_{1,1}$ is related to a corresponding ACK/NACK transmission manner. For example, when corresponding ACK/NACK is transmitted by using a PUCCH, $d_{1,1}$=0; or when corresponding ACK/NACK is transmitted by using a PUSCH, $d_{1,1}$=1.

In at least one implementation, a value of $d_{1,2}$ is related to a PDSCH mapping manner. For example, if a PDSCH mapping manner is of the mapping type A stipulated according to the section 7.4.1.1 of the 3GPP technical specification (TS) 38.211, and a last symbol of a PDSCH is an $i^{th}$ symbol of a slot less than 7, $d_{1,2}$=7−i. For another example, if a PDSCH mapping manner is of the mapping type B stipulated according to the section 7.4.1.1 of the 3GPP technical specification (TS) 38.211, and a quantity of symbols of an allocated PDSCH is 4, $d_{1,2}$=3. For another example, if a PDSCH mapping manner is of the mapping type B stipulated according to the section 7.4.1.1 of the 3GPP technical specification (TS) 38.211, and a quantity of symbols of an allocated PDSCH is 2, $d_{1,2}$=3+d, where d is a quantity of overlapping symbols of a scheduled PDCCH and the allocated PDSCH. For another example, if a PDSCH mapping manner is neither of the foregoing mapping type A nor of the foregoing mapping type B, $d_{1,2}$=0.

In at least one implementation, the at least one piece of DCI includes DCI used for scheduling a PUSCH, where the plurality of uplink channels/signals include the PUSCH; and/or DCI used for indicating downlink semi-persistent scheduled (DL SPS) resource release, where the plurality of uplink channels/signals include a PUCCH carrying ACK/NACK corresponding to the DCI for indicating DL SPS resource release; and/or DCI used for scheduling a physical downlink shared channel (PDSCH), where the plurality of uplink channels/signals include a PUCCH carrying ACK/NACK corresponding to the PDSCH.

In at least one implementation, the uplink channels/signals include a dynamic scheduled physical uplink shared channel (PUSCH); a semi-persistent scheduled PUSCH (SPS PUSCH); a physical uplink control channel (PUCCH) for carrying acknowledgment/negative-acknowledgment (ACK/NACK) corresponding to a semi-persistent scheduled physical downlink shared channel (SPS-PDSCH); a physical uplink control channel (PUCCH) for carrying periodic channel state information (P-CSI); a physical uplink control channel (PUCCH) for carrying semi-persistent scheduled channel state information (SPS-CSI); a physical uplink shared channel (PUSCH) for carrying semi-persistent scheduled channel state information (SPS-CSI); and a physical uplink control channel (PUCCH) for carrying a scheduling request (SR).

The constraint condition in this implementation of the present disclosure is exemplarily described below with reference to accompanying drawings.

Figure 7:
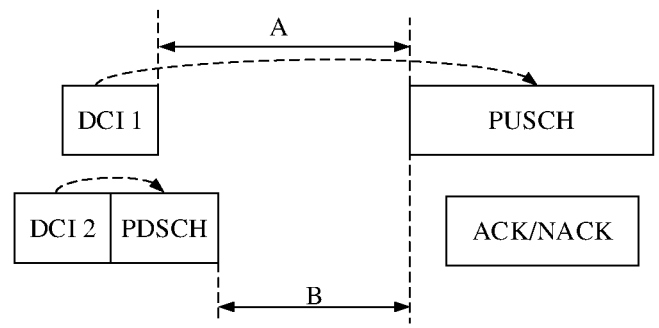
FIG. 7 to FIG. 10 are other schematic block diagrams of a constraint condition according to an implementation of the present disclosure.

FIG. 7 is a schematic block diagram of the constraint condition in a scenario in which the plurality of uplink channels/signals include at least one PUCCH for carrying ACK/NACK corresponding to a target PDSCH.

As shown in FIG. 7, the terminal device receives DCI 1 and DCI 2 sent by the network device, where the DCI 1 is DCI used for scheduling a PUSCH, and the plurality of uplink channels/signals include the PUSCH. The DCI 2 is DCI used for scheduling a PDSCH, and the plurality of uplink channels/signals include a PUCCH carrying ACK/NACK corresponding to the PDSCH.

The constraint condition includes: the first symbol of the earliest uplink channel/signal of the plurality of uplink channels/signals is not before an $A^{th}$ symbol after a last symbol of a PDCCH carrying the at least one piece of DCI, where A is a non-negative integer.

Specifically, the terminal device can determine that an earliest uplink channel/signal of the plurality of uplink channels/signals is the PUSCH scheduled by the DCI 1, a last symbol of the PDCCH used for carrying the at least one piece of DCI is a PDCCH used for carrying the DCI 1, and a first symbol of the PUSCH scheduled by the DCI 1 is not before an $A^{th}$ symbol after the last symbol of the PDCCH for carrying the at least one piece of DCI 1, where A is a non-negative integer.

Moreover, the constraint condition further includes: the first symbol of the earliest uplink channel/signal of the plurality of uplink channels/signals is not before a $B^{th}$ symbol after a last symbol of the at least one target PDSCH, where B is a non-negative integer. Specifically, the terminal device can determine that an earliest uplink channel/signal of the plurality of uplink channels/signals is the PUSCH scheduled by the DCI 1, and the last symbol of the at least one target PDSCH is a PDSCH scheduled by the DCI 2. Therefore, a first symbol of the PUSCH scheduled by the DCI 1 is not before a $B^{th}$ symbol after a last symbol of the PDSCH scheduled by the DCI 2.

Therefore, the terminal device can determine that the plurality of uplink channels/signals fulfill the constraint condition.

It should be understood that FIG. 7 is only an example in which the plurality of uplink channels/signals include one PUCCH for carrying ACK/NACK corresponding to a target PDSCH. In this example, the foregoing at least one piece of DCI includes the DCI 1 and the DCI 2, where the DCI 1 is DCI used for scheduling a PUSCH, and the plurality of uplink channels/signals include the PUSCH. The DCI 2 is DCI used for scheduling a PDSCH, and the plurality of uplink channels/signals include a PUCCH carrying ACK/NACK corresponding to the PDSCH. However, the implementations of the present disclosure are not limited thereto.

Figure 8:
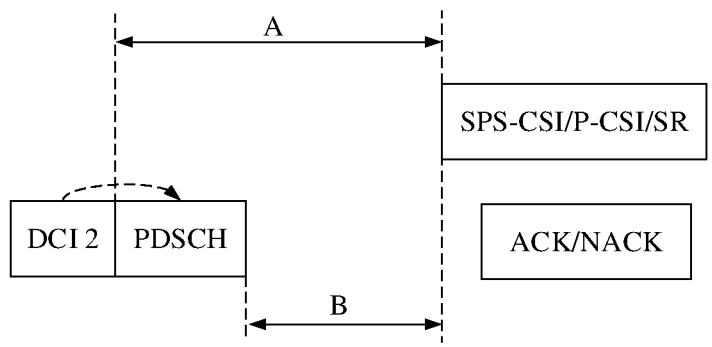

For example, as shown in FIG. 8, the at least one piece of DCI may include only the DCI 2.

Figure 9:
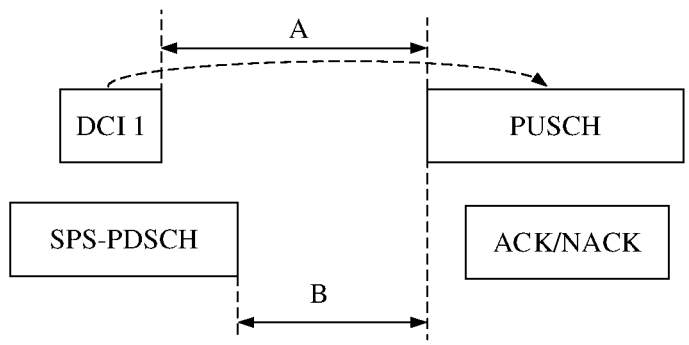

For another example, as shown in FIG. 9, the at least one piece of DCI may include only the DCI 1. Moreover, the plurality of uplink channels/signals may include a physical uplink control channel (PUCCH) for carrying acknowledgment/negative-acknowledgment (ACK/NACK) corresponding to a semi-persistent scheduled physical downlink shared channel (SPS-PDSCH). In this case, the SPS-PDSCH may be used as the target PDSCH in this implementation of the present disclosure.

It should be further understood that, in examples of FIG. 7 to FIG. 9, if the plurality of uplink channels/signals fulfill the constraint condition, the plurality of uplink channels/signals need to simultaneously fulfill the following conditions: The first symbol of the earliest uplink channel/signal of the plurality of uplink channels/signals is not before an $A^{th}$ symbol after a last symbol of a PDCCH carrying the at least one piece of DCI, where A is a non-negative integer. Moreover, the first symbol of the earliest uplink channel/signal of the plurality of uplink channels/signals is not before a $B^{th}$ symbol after a last symbol of the at least one target PDSCH, where B is a non-negative integer. However, the implementations of the present disclosure are not limited thereto.

Figure 10:
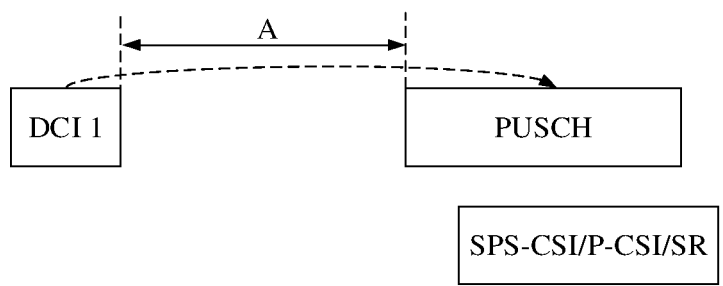

FIG. 10 is a schematic block diagram of the constraint condition in a scenario in which the plurality of uplink channels/signals include a PUSCH scheduled by DCI 1 and another periodic uplink channel/signal according to an implementation of the present disclosure. As shown in FIG. 10, the plurality of uplink channels/signals include the PUSCH scheduled by the DCI 1 and a periodic uplink channel/signal used for carrying SPS-CSI/P-CSI/SR. In this case, the first symbol of the earliest uplink channel/signal of the plurality of uplink channels/signals is not before an $A^{th}$ symbol after a last symbol of a PDCCH carrying the at least one piece of DCI, where A is a non-negative integer, and the terminal device may determine that the plurality of uplink channels/signals fulfill the constraint condition.

Specifically, the terminal device can determine that the PUSCH scheduled by the DCI 1 is before the periodic uplink channel/signal used for carrying SPS-CSI/P-CSI/SR. Further, the PUSCH scheduled by the DCI 1 is not before an $A^{th}$ symbol after a last symbol of the periodic uplink channel/signal used for carrying SPS-CSI/P-CSI/SR.

Using an example in which the target time unit is a slot n, in this implementation of the present disclosure, the terminal device needs to transmit one PUCCH and at least one other uplink channel (PUCCH or PUSCH) in the slot n, and the PUCCH and the at least one other uplink channel overlap in time. The terminal device receives at least one piece of DCI, and the DCI is used for indicating uplink transmission in the slot n (DCI for scheduling a PUSCH transmitted in the slot n; or DCI for scheduling transmission of a PDSCH, where ACK/NACK corresponding to the PDSCH is transmitted in the slot n; or DCI for indicating DL SPS resource release, where ACK/NACK corresponding to the DCI is transmitted in the slot n). As shown in FIG. 7 to FIG. 10, if the PUCCH and the at least one other uplink channel fulfill the following condition, all UCI or data information is carried through one uplink channel.

If ACK/NACK corresponding to at least one PDSCH is transmitted in the slot n, a first symbol of an earliest channel of overlapping channels is not before an $A^{th}$ symbol after a last symbol of a PDCCH for carrying the at least one piece of DCI; and/or if ACK/NACK corresponding to at least one PDSCH is transmitted in the slot n, a first symbol of an earliest channel of overlapping channels is not before a $B^{th}$ symbol after a last PDSCH of the at least one PDSCH.

A manner of determining the constraint condition when the terminal device receives DCI according to an implementation of the present disclosure is described above in detail from the perspective of the terminal device with reference to FIG. 6 to FIG. 10, but the implementations of the present disclosure are not limited thereto. As shown in FIG. 6, the method of this implementation of the present disclosure may also be applied to a network device. Correspondingly, the network device sends at least one piece of DCI to the terminal device; the network device determines a plurality of uplink channels/signals transmitted within a target time unit, where the plurality of uplink channels/signals at least partially overlap in time domain, and the at least one piece of DCI is used for indicating at least one uplink channel/signal of the plurality of uplink channels/signals; and the network device receives, when the plurality of uplink channels/signals fulfill a constraint condition, one channel/signal within the target time unit, and multiplexing information carried in the plurality of uplink channels/signals in the channel/signal for transmission. The constraint condition includes the first symbol of the earliest uplink channel/signal of the plurality of uplink channels/signals is not before an $A^{th}$ symbol after a last symbol of a PDCCH carrying the at least one piece of DCI, where A is a non-negative integer.

In at least one implementation, $A=N2+1$, where N2 is a preparation time of scheduling a PUSCH.

In at least one implementation, $A=N2+d_{2,1}$, where N2 is a preparation time of a PUSCH.

In at least one implementation, a value of $d_{2,1}$ is related to a demodulation reference signal (DMRS) structure in a PUSCH. For example, only when a first time domain symbol in a PUSCH includes a DMRS, $d_{2,1}=0$; otherwise $d_{2,1}=1$.

In at least one implementation, the plurality of uplink channels/signals include at least one PUCCH for carrying ACK/NACK corresponding to a target PDSCH; and the constraint condition further includes the first symbol of the earliest uplink channel/signal of the plurality of uplink channels/signals is not before a $B^{th}$ symbol after a last symbol of the at least one target PDSCH, where B is a non-negative integer.

In at least one implementation, $B=N1+1+d_{1,2}$, where N1 is a processing time of a PDSCH.

In at least one implementation, $B=N2+d_{1,1}+d_{1,2}$, where N1 is a processing time of a PDSCH.

In at least one implementation, a value of $d_{1,1}$ is related to a corresponding ACK/NACK transmission manner. For example, when corresponding ACK/NACK is transmitted by using a PUCCH, $d_{1,1}=0$; or when corresponding ACK/NACK is transmitted by using a PUSCH, $d_{1,1}=1$.

In at least one implementation, a value of $d_{1,2}$ is related to a PDSCH mapping manner. For example, if a PDSCH mapping manner is of the mapping type A stipulated according to the section 7.4.1.1 of the 3GPP technical specification (TS) 38.211, and a last symbol of a PDSCH is an $i^{th}$ symbol of a slot less than 7, $d_{1,2}=7-i$. For another example, if a PDSCH mapping manner is of the mapping type B stipulated according to the section 7.4.1.1 of the 3GPP technical specification (TS) 38.211, and a quantity of symbols of an allocated PDSCH is 4, $d_{1,2}=3$. For another example, if a PDSCH mapping manner is of the mapping type B stipulated according to the section 7.4.1.1 of the 3GPP technical specification (TS) 38.211, and a quantity of symbols of an allocated PDSCH is 2, $d_{1,2}=3+d$, where d is a quantity of overlapping symbols of a scheduled PDCCH and the allocated PDSCH. For another example, if a PDSCH mapping manner is neither of the foregoing mapping type A nor of the foregoing mapping type B, $d_{1,2}=0$.

In at least one implementation, the at least one piece of DCI includes DCI used for scheduling a PUSCH, where the plurality of uplink channels/signals include the PUSCH; and/or DCI used for indicating downlink semi-persistent scheduled (DL SPS) resource release, where the plurality of uplink channels/signals include a PUCCH carrying ACK/

NACK corresponding to the DCI for indicating DL SPS resource release; and/or DCI used for scheduling a PDSCH, where the plurality of uplink channels/signals include a PUCCH carrying ACK/NACK corresponding to the PDSCH.

In at least one implementation, the uplink channels/signals include a dynamic scheduled physical uplink shared channel (PUSCH); a semi-persistent scheduled PUSCH (SPS PUSCH); a physical uplink control channel (PUCCH) for carrying acknowledgment/negative-acknowledgment (ACK/NACK) corresponding to a semi-persistent scheduled physical downlink shared channel (SPS-PDSCH); a physical uplink control channel (PUCCH) for carrying periodic channel state information (P-CSI); a physical uplink control channel (PUCCH) for carrying semi-persistent scheduled channel state information (SPS-CSI); a physical uplink shared channel (PUSCH) for carrying semi-persistent scheduled channel state information (SPS-CSI); and a physical uplink control channel (PUCCH) for carrying a scheduling request (SR).

In this implementation of the present disclosure, the plurality of uplink channels/signals may include more than two uplink channel/signals, and therefore the terminal device or the network device needs to determine an uplink channel/signal used for actual transmission in the plurality of uplink channels/signals.

Figure 11:
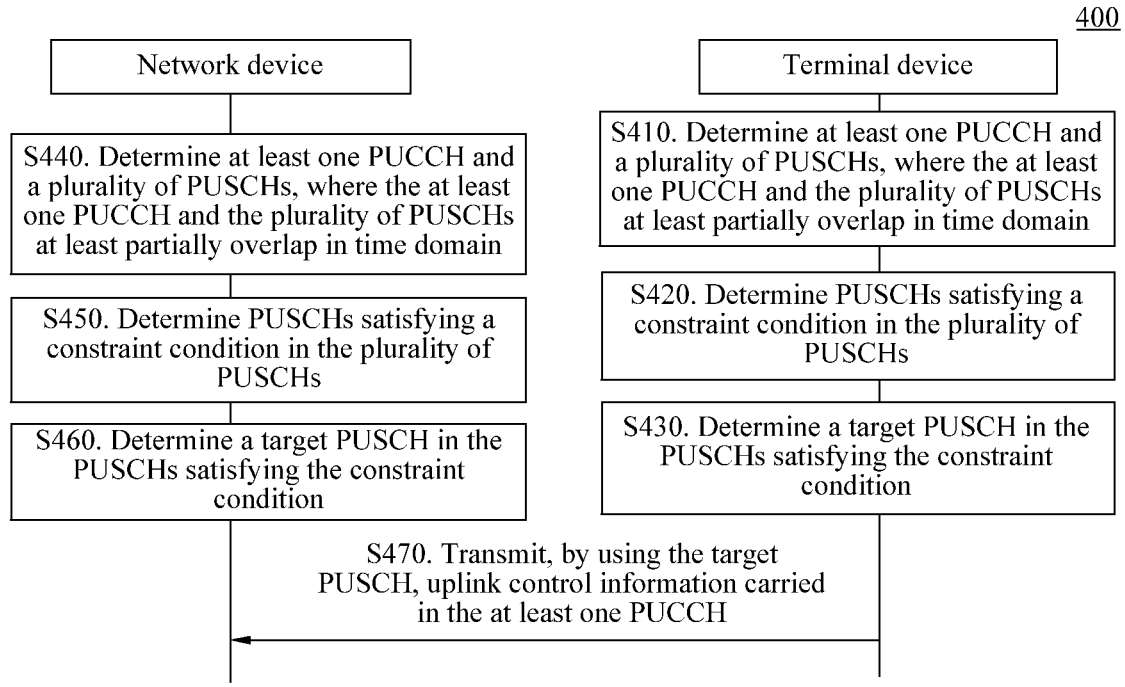
FIG. 11 is another schematic flowchart of a wireless communications method according to an implementation of the present disclosure.
Figure 12:
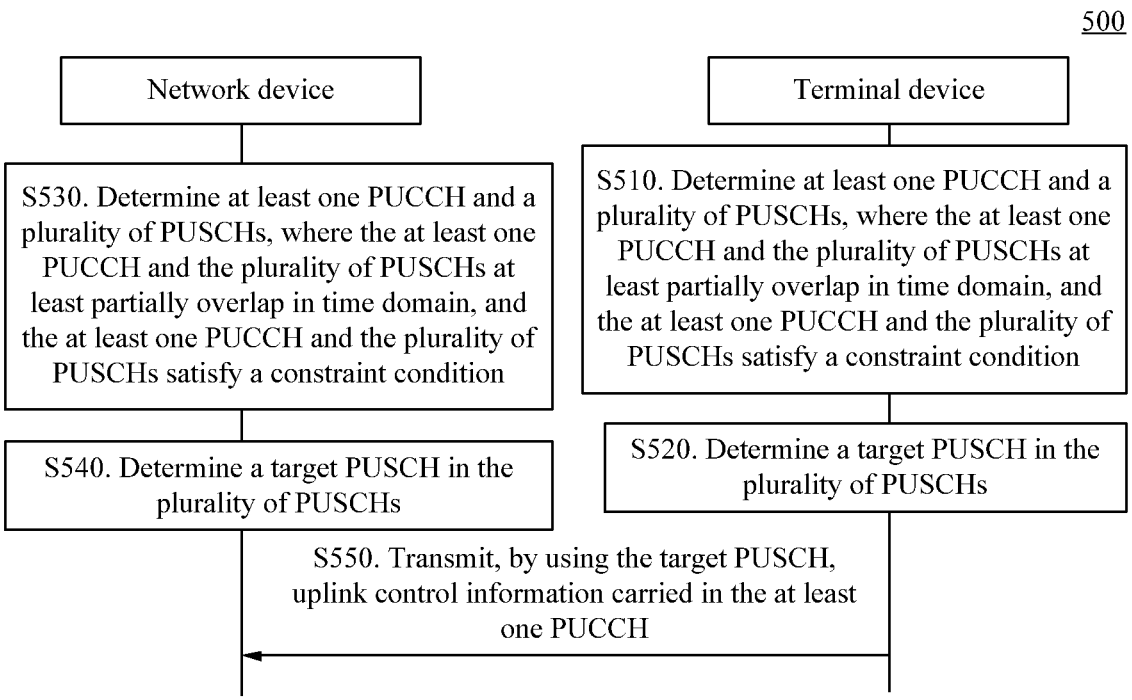
FIG. 12 is another schematic flowchart of a wireless communications method according to an implementation of the present disclosure.

Exemplary description is made below by using an example in which the plurality of uplink channels/signals include at least one PUCCH and a plurality of PUSCHs, and using an example in which uplink control information carried in the at least one PUCCH is multiplexed in a target PUSCH of the plurality of PUSCHs and transmitted:

FIG. 11 and FIG. 12 are each a schematic flowchart of determining a target PUSCH according to an implementation of the present disclosure. A terminal device shown in FIG. 11 and FIG. 12 may be a terminal device shown in FIG. 1, and a network device shown in FIG. 11 and FIG. 12 may be an access network device shown in FIG. 1.

As shown in FIG. 11, using an example in which an execution body is a terminal device, the method 400 includes some or all of the following content.

S410. A terminal device determines at least one PUCCH and a plurality of PUSCHs, where the at least one PUCCH and the plurality of PUSCHs at least partially overlap in time domain.

S420. The terminal device determines PUSCHs fulfilling a constraint condition in the plurality of PUSCHs.

S430. The terminal device determines a target PUSCH in the PUSCHs fulfilling the constraint condition.

S470. The terminal device transmits, by using the target PUSCH, uplink control information carried in the at least one PUCCH.

Correspondingly, using an example in which an execution body is a network device, the method 400 includes some or all of the following content.

S440. Determine at least one PUCCH and a plurality of PUSCHs, where the at least one PUCCH and the plurality of PUSCHs at least partially overlap in the time domain.

S450. Determine PUSCHs fulfilling a constraint condition in the plurality of PUSCHs.

S460. Determine a target PUSCH in the PUSCHs fulfilling the constraint condition.

S470. Transmit, by using the target PUSCH, uplink control information carried in the at least one PUCCH.

In at least one implementation, the target PUSCH is an earliest PUSCH of the PUSCHs fulfilling the constraint condition. Specifically, if one PUCCH and a plurality of PUSCHs overlap in the time domain, the terminal device or the network device selects a first PUSCH fulfilling the constraint condition from the plurality of PUSCHs to carry content in the PUCCH.

In at least one implementation, the target PUSCH is any PUSCH of the PUSCHs fulfilling the constraint condition.

In short, the terminal device or the network device first determines at least one PUCCH and a plurality of PUSCHs that at least partially overlap in the time domain, then determines PUSCHs fulfilling the constraint condition in the plurality of PUSCHs, and further determines a target PUSCH in the PUSCHs fulfilling the constraint condition. Furthermore, after determining the target PUSCH, the terminal device transmits, by using the target PUSCH, uplink control information carried in the at least one PUCCH, and the network device correspondingly receives the target PUSCH. It should be understood that the constraint condition is any constraint condition related to the foregoing implementations. To avoid repetition, details are not described herein again.

As shown in FIG. 12, using an example in which an execution body is a terminal device, the method 400 includes some or all of the following content.

S510. A terminal device determines at least one PUCCH and a plurality of PUSCHs, where the at least one PUCCH and the plurality of PUSCHs at least partially overlap in the time domain, and the at least one PUCCH and the plurality of PUSCHs fulfill a constraint condition.

S520. The terminal device determines a target PUSCH in the plurality of PUSCHs.

S550. The terminal device transmits, by using the target PUSCH, uplink control information carried in the at least one PUCCH.

Correspondingly, using an example in which an execution body is a network device, the method 400 includes some or all of the following content.

S510. A network device determines at least one PUCCH and a plurality of PUSCHs, where the at least one PUCCH and the plurality of PUSCHs at least partially overlap in the time domain, and the at least one PUCCH and the plurality of PUSCHs fulfill a constraint condition.

S520. The network device determines a target PUSCH in the plurality of PUSCHs.

S550. The network device transmits, by using the target PUSCH, uplink control information carried in the at least one PUCCH.

In at least one implementation, the target PUSCH is an earliest PUSCH of the PUSCHs fulfilling the constraint condition. Specifically, if one PUCCH and a plurality of PUSCHs overlap in the time domain, the terminal device or the network device selects a first PUSCH fulfilling the constraint condition from the plurality of PUSCHs to carry content in the PUCCH.

In at least one implementation, the target PUSCH is any PUSCH of the PUSCHs fulfilling the constraint condition.

In short, the terminal device or the network device first determines at least one PUCCH and a plurality of PUSCHs that at least partially overlap in the time domain, where the at least one PUCCH and the plurality of PUSCHs fulfill a constraint condition; and then determines a target PUSCH in the PUSCHs fulfilling the constraint condition. After determining the target PUSCH, the terminal device transmits, by using the target PUSCH, uplink control information carried in the at least one PUCCH, and the network device correspondingly receives the target PUSCH. It should be understood that the constraint condition is any constraint condition related to the foregoing implementations. To avoid repetition, details are not described herein again.

Figure 13:
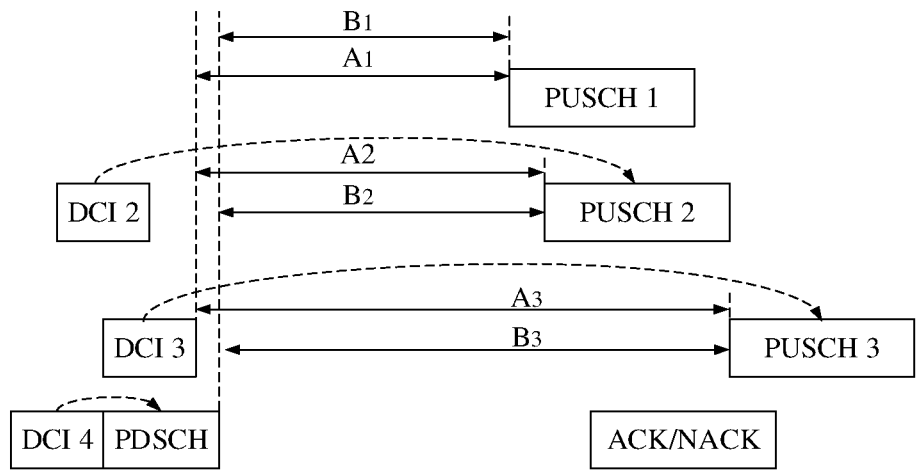
FIG. 13 is another schematic block diagram of a constraint condition according to an implementation of the present disclosure.

FIG. 13 is a schematic block diagram of determining a target PUSCH in a scenario in which the plurality of uplink channels/signals include at least one PUCCH and a plurality of PUSCHs according to an implementation of the present disclosure.

As shown in FIG. 13, DCI received by the terminal device includes DCI 2, DCI 3, and DCI 4, where the DCI 2 is DCI used for scheduling a PUSCH 2, and the plurality of uplink channels/signals include the PUSCH 2. The DCI 3 is DCI used for scheduling a PUSCH 3, where the plurality of uplink channels/signals include the PUSCH 3. The DCI 4 is DCI used for scheduling a PDSCH, and the plurality of uplink channels/signals include a PUCCH carrying ACK/NACK corresponding to the PDSCH. Moreover, the plurality of uplink channels/signals include a PUSCH 1 (for example, a periodic uplink channel/signal).

As shown in FIG. 13, if A1, B1, A2, B2, A3, and B3 each fulfill the constraint condition related to this implementation of the present disclosure, the PUSCH 1 is determined as a target PUSCH. If A1 and/or B1 does not fulfill the constraint condition, and A2, B2, A3, and B3 each fulfill the constraint condition related to this implementation of the present disclosure, the PUSCH 2 is determined as a target PUSCH. If A1 and/or B1 does not fulfill the constraint condition, A2 and/or B2 does not fulfill the constraint condition, and A3 and/or B3 each satisfies the constraint condition related to this implementation of the present disclosure, the PUSCH 3 is determined as a target PUSCH.

Exemplary implementations of the present disclosure are described above in detail with reference to accompanying drawings, but the present disclosure is not limited to specific details in the foregoing implementations. A plurality of simple variants may be made to the technical solutions of the present disclosure within the technical concept scope of the present disclosure, and these simple variants all fall within the protection scope of the present disclosure.

For example, specific technical characteristics described in the foregoing specific implementations may be combined in any appropriate manner without contradiction. To avoid unnecessary repetition, various possible combination manners are not further described in the present disclosure. For another example, various different implementations of the present disclosure may also be randomly combined with each other, provided that the combination does not depart from the idea of the present disclosure. The combination should be similarly considered as content disclosed by the present disclosure.

It should be understood that sequence numbers of the foregoing processes do not mean execution orders in various method implementations of the present disclosure. The execution orders of the processes should be determined according to functions and internal logic of the processes and should not be construed as any limitation on the implementation processes of the implementations of the present disclosure.

The method implementations of the present disclosure are described above in detail with reference to FIG. 1 to FIG. 13, and apparatus implementations of the present disclosure are described below in detail with reference to FIG. 14 to FIG. 17.

Figure 14:
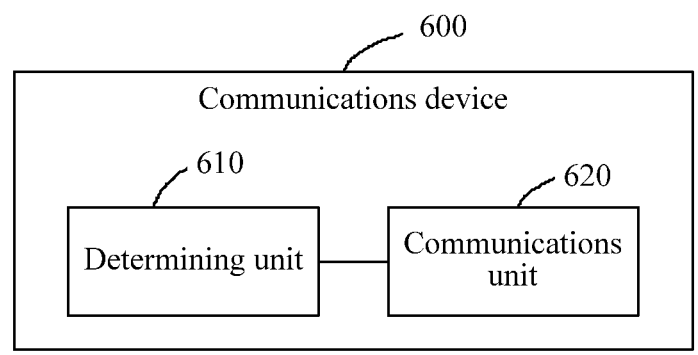
FIG. 14 is a schematic block diagram of a communications device according to an implementation of the present disclosure.

FIG. 14 is a schematic block diagram of a communications device 600 according to an implementation of the present disclosure.

Specifically, as shown in FIG. 14, the communications device 600 may include a determining unit 610 and a communications unit 620. The determining unit 610 is configured to perform an internal operation in the communications device 600, and the communications unit 620 is configured to communicate with an external device and/or an internal device.

The communications device 600 may be the terminal device shown in FIG. 1 and is configured to perform steps performed by the terminal device in the implementations of the present disclosure.

In an implementation, the determining unit 610 is configured to determine a plurality of uplink channels/signals transmitted within a target time unit, where the plurality of uplink channels/signals at least partially overlap in the time domain; and the communications unit 620 is configured to multiplex, when the plurality of uplink channels/signals fulfill a constraint condition, information carried in the plurality of uplink channels/signals in one channel/signal within the target time unit for transmission. The constraint condition includes a first symbol of an earliest uplink channel/signal of the plurality of uplink channels/signals is not before an $A^{th}$ symbol after a start time or after a last symbol of a target channel/signal, where A is a non-negative integer.

In at least one implementation, the constraint condition further includes a start time of the earliest uplink channel/signal of the plurality of uplink channels/signals is not before a $B^{th}$ symbol after the last symbol of the target channel/signal, where B is a non-negative integer.

In at least one implementation, each uplink channel/signal of the plurality of uplink channels/signals is a periodic uplink channel/signal.

In at least one implementation, the plurality of uplink channels/signals include at least one physical uplink control channel (PUCCH) used for carrying acknowledgment/negative-acknowledgment (ACK/NACK) corresponding to a semi-persistent scheduled physical downlink shared channel (SPS-PDSCH); and the target channel/signal is a last SPS-PDSCH of SPS-PDSCHs corresponding to the at least one PUCCH.

In at least one implementation, the plurality of uplink channels/signals include no physical uplink control channel (PUCCH) used for carrying acknowledgment/negative-acknowledgment (ACK/NACK) corresponding to a semi-persistent scheduled physical downlink shared channel (SPS-PDSCH); and the target channel/signal is a last uplink channel/signal of the plurality of uplink channels/signals sent before the target time unit.

In at least one implementation, when the determining unit 610 determines that the plurality of uplink channels/signals do not fulfill the constraint condition, the communications unit 620 is specifically configured to transmit a PUCCH of the at least one PUCCH.

In at least one implementation, when the determining unit 610 determines that the plurality of uplink channels/signals do not fulfill the constraint condition, the determining unit 610 is further configured to determine that the plurality of uplink channels/signals to be transmitted within the target time unit are in error; or when the determining unit 610 determines that the plurality of uplink channels/signals do not fulfill the constraint condition, the communications unit 620 is specifically configured to transmit the earliest uplink channel/signal of the plurality of uplink channels/signals.

In at least one implementation, the uplink channels/signals include a semi-persistent scheduled PUSCH (SPS PUSCH); a physical uplink control channel (PUCCH) for carrying acknowledgment/negative-acknowledgment (ACK/NACK) corresponding to a semi-persistent scheduled physical downlink shared channel (SPS-PDSCH); a physical uplink control channel (PUCCH) for carrying periodic channel state information (P-CSI); a physical uplink control channel (PUCCH) for carrying semi-persistent scheduled channel state information (SPS-CSI); a physical uplink shared channel (PUSCH) for carrying semi-persistent scheduled channel state information (SPS-CSI); and a physical uplink control channel (PUCCH) for carrying a scheduling request (SR).

In at least one implementation, A=N2+1, where N2 is a preparation time of a physical uplink shared channel (PUSCH).

In at least one implementation, B=N1+1+$d_{1,2}$, where N1 is a processing time of a physical downlink shared channel (PDSCH), and a value of $d_{1,2}$ is related to a PDSCH mapping manner.

In another implementation, the communications unit 620 is configured to receive at least one piece of downlink control information (DCI); and the determining unit 610 is configured to determine a plurality of uplink channels/signals transmitted within a target time unit, where the plurality of uplink channels/signals at least partially overlap in the time domain, and the at least one piece of DCI is used for indicating at least one uplink channel/signal of the plurality of uplink channels/signals; and when the plurality of uplink channels/signals fulfill a constraint condition, the communications unit 620 is further configured to multiplex information carried in the plurality of uplink channels/signals in one channel/signal within the target time unit for transmission. The constraint condition includes a first symbol of an earliest uplink channel/signal of the plurality of uplink channels/signals is not before an $A^{th}$ symbol after a last symbol of a physical downlink control channel (PDCCH) carrying the at least one piece of DCI, where A is a non-negative integer.

In at least one implementation, the plurality of uplink channels/signals include at least one physical uplink control channel (PUCCH) carrying acknowledgment/negative-acknowledgment (ACK/NACK) corresponding to a target physical downlink shared channel (PDSCH); and the constraint condition further includes: the first symbol of the earliest uplink channel/signal of the plurality of uplink channels/signals is not before a $B^{th}$ symbol after a last symbol of the at least one target PDSCH, where B is a non-negative integer.

In at least one implementation, the at least one piece of DCI includes DCI used for scheduling a PUSCH, where the plurality of uplink channels/signals include the PUSCH; and/or DCI used for indicating downlink semi-persistent scheduled (DL SPS) resource release, where the plurality of uplink channels/signals include a PUCCH carrying ACK/NACK corresponding to the DCI for indicating DL SPS resource release; and/or DCI used for scheduling a physical downlink shared channel (PDSCH), where the plurality of uplink channels/signals include a PUCCH carrying ACK/NACK corresponding to the PDSCH.

In at least one implementation, the uplink channels/signals include a dynamic scheduled physical uplink shared channel (PUSCH); a semi-persistent scheduled PUSCH (SPS PUSCH); a physical uplink control channel (PUCCH) for carrying acknowledgment/negative-acknowledgment (ACK/NACK) corresponding to a semi-persistent scheduled physical downlink shared channel (SPS-PDSCH); a physical uplink control channel (PUCCH) for carrying periodic channel state information (P-CSI); a physical uplink control channel (PUCCH) for carrying semi-persistent scheduled channel state information (SPS-CSI); a physical uplink shared channel (PUSCH) for carrying semi-persistent scheduled channel state information (SPS-CSI); and a physical uplink control channel (PUCCH) for carrying a scheduling request (SR).

In at least one implementation, A=N2+1, where N2 is a preparation time of scheduling a physical uplink shared channel (PUSCH).

In at least one implementation, B=N1+1+$d_{1,2}$, where N1 is a processing time of a PDSCH, and a value of $d_{1,2}$ is related to a physical downlink shared channel (PDSCH) mapping manner.

In another implementation, the determining unit 610 is configured to determine at least one physical uplink control channel (PUCCH) and a plurality of physical uplink shared channels (PUSCH), where the at least one PUCCH and the plurality of PUSCHs at least partially overlap in time domain; determine PUSCHs fulfilling a constraint condition in the plurality of PUSCHs; and determine a target PUSCH in the PUSCHs fulfilling the constraint condition; and the communications unit 620 is configured to transmit, by using the target PUSCH, uplink control information carried in the at least one PUCCH.

The constraint condition is any constraint condition in the foregoing wireless communications methods.

In at least one implementation, the target PUSCH is an earliest PUSCH of the PUSCHs fulfilling the constraint condition.

In at least one implementation, the target PUSCH is any PUSCH of the PUSCHs fulfilling the constraint condition.

In another implementation, the determining unit 610 is configured to determine at least one physical uplink control channel (PUCCH) and a plurality of physical uplink shared channels (PUSCH), where the at least one PUCCH and the plurality of PUSCHs at least partially overlap in the time domain, and the at least one PUCCH and the plurality of PUSCHs fulfill a constraint condition; and determine a target PUSCH in the plurality of PUSCHs; and the communications unit 620 is configured to transmit, by using the target PUSCH, uplink control information carried in the at least one PUCCH. The constraint condition is any constraint condition in the foregoing wireless communications methods.

In at least one implementation, the target PUSCH is an earliest PUSCH of the PUSCHs fulfilling the constraint condition.

In at least one implementation, the target PUSCH is any PUSCH of the PUSCHs fulfilling the constraint condition.

The communications device 600 shown in FIG. 14 may be further the network device shown in FIG. 1 and is configured to perform steps performed by the network device in the implementations of the present disclosure.

In an implementation, the determining unit 610 is configured to determine a plurality of uplink channels/signals transmitted within a target time unit, where the plurality of uplink channels/signals at least partially overlap in the time domain; and the communications unit 620 is configured to receive, when the plurality of uplink channels/signals fulfill a constraint condition, one channel/signal within the target time unit, and multiplexing information carried in the plurality of uplink channels/signals in the channel/signal for transmission. The constraint condition includes a first symbol of an earliest uplink channel/signal of the plurality of uplink channels/signals is not before an $A^{th}$ symbol after a start time or after a last symbol of a target channel/signal, where A is a non-negative integer.

In at least one implementation, the constraint condition further includes a start time of the earliest uplink channel/ signal of the plurality of uplink channels/signals is not before a $B^{th}$ symbol after the last symbol of the target channel/signal, where B is a non-negative integer.

In at least one implementation, each uplink channel/signal of the plurality of uplink channels/signals is a periodic uplink channel/signal.

In at least one implementation, the plurality of uplink channels/signals include at least one physical uplink control channel (PUCCH) used for carrying acknowledgment/negative-acknowledgment (ACK/NACK) corresponding to a semi-persistent scheduled physical downlink shared channel (SPS-PDSCH); and the target channel/signal is a last SPS-PDSCH of SPS-PDSCHs corresponding to the at least one PUCCH.

In at least one implementation, the plurality of uplink channels/signals include no physical uplink control channel (PUCCH) used for carrying acknowledgment/negative-acknowledgment (ACK/NACK) corresponding to a semi-persistent scheduled physical downlink shared channel (SPS-PDSCH); and the target channel/signal is a last uplink channel/signal of the plurality of uplink channels/signals received before the target time unit.

In at least one implementation, when the determining unit 610 determines that the plurality of uplink channels/signals do not fulfill the constraint condition, the communications unit 620 is specifically configured to receive a PUCCH of the at least one PUCCH.

In at least one implementation, when the determining unit 610 determines that the plurality of uplink channels/signals do not fulfill the constraint condition, the determining unit 610 is further configured to determine that the plurality of uplink channels/signals to be transmitted within the target time unit are in error; or when the determining unit 610 determines that the plurality of uplink channels/signals do not fulfill the constraint condition, the communications unit 620 is specifically configured to receive the earliest uplink channel/signal of the plurality of uplink channels/signals.

In at least one implementation, the uplink channels/signals include a semi-persistent scheduled PUSCH (SPS PUSCH); a physical uplink control channel (PUCCH) for carrying acknowledgment/negative-acknowledgment (ACK/NACK) corresponding to a semi-persistent scheduled physical downlink shared channel (SPS-PDSCH); a physical uplink control channel (PUCCH) for carrying periodic channel state information (P-CSI); a physical uplink control channel (PUCCH) for carrying semi-persistent scheduled channel state information (SPS-CSI); a physical uplink shared channel (PUSCH) for carrying semi-persistent scheduled channel state information (SPS-CSI); and a physical uplink control channel (PUCCH) for carrying a scheduling request (SR).

In at least one implementation, A=N2+1, where N2 is a preparation time of a physical uplink shared channel (PUSCH).

In at least one implementation, B=N1+1+$d_{1,2}$, where N1 is a processing time of a physical downlink shared channel (PDSCH), and a value of $d_{1,2}$ is related to a PDSCH mapping manner.

In another implementation, the communications unit 620 is configured to send at least one piece of downlink control information (DCI) to a terminal device; and the determining unit 610 is configured to determine a plurality of uplink channels/signals transmitted within a target time unit, where the plurality of uplink channels/signals at least partially overlap in the time domain, and the at least one piece of DCI is used for indicating at least one uplink channel/signal of the plurality of uplink channels/signals; and when the plurality of uplink channels/signals fulfill a constraint condition, the communications unit 620 is further configured to receive one channel/signal within the target time unit, and multiplexing information carried in the plurality of uplink channels/signals in the channel/signal for transmission. The constraint condition includes a first symbol of an earliest uplink channel/signal of the plurality of uplink channels/signals is not before an $A^{th}$ symbol after a last symbol of a physical downlink control channel (PDCCH) carrying the at least one piece of DCI, where A is a non-negative integer.

In at least one implementation, the plurality of uplink channels/signals include at least one physical uplink control channel (PUCCH) carrying acknowledgment/negative-acknowledgment (ACK/NACK) corresponding to a target physical downlink shared channel (PDSCH). The constraint condition further includes: the first symbol of the earliest uplink channel/signal of the plurality of uplink channels/signals is not before a $B^{th}$ symbol after a last symbol of the at least one target PDSCH, where B is a non-negative integer.

In at least one implementation, the at least one piece of DCI includes DCI used for scheduling a PUSCH, where the plurality of uplink channels/signals include the PUSCH; and/or DCI used for indicating downlink semi-persistent scheduled (DL SPS) resource release, where the plurality of uplink channels/signals include a PUCCH carrying ACK/NACK corresponding to the DCI for indicating DL SPS resource release; and/or DCI used for scheduling a physical downlink shared channel (PDSCH), where the plurality of uplink channels/signals include a PUCCH carrying ACK/NACK corresponding to the PDSCH.

In at least one implementation, the uplink channels/signals include a dynamic scheduled physical uplink shared channel (PUSCH); a semi-persistent scheduled PUSCH (SPS PUSCH); a physical uplink control channel (PUCCH) for carrying acknowledgment/negative-acknowledgment (ACK/NACK) corresponding to a semi-persistent scheduled physical downlink shared channel (SPS-PDSCH); a physical uplink control channel (PUCCH) for carrying periodic channel state information (P-CSI); a physical uplink control channel (PUCCH) for carrying semi-persistent scheduled channel state information (SPS-CSI); a physical uplink shared channel (PUSCH) for carrying semi-persistent scheduled channel state information (SPS-CSI); and a physical uplink control channel (PUCCH) for carrying a scheduling request (SR).

In at least one implementation, A=N2+1, where N2 is a preparation time of scheduling a physical uplink shared channel (PUSCH).

In at least one implementation, B=N1+1+$d_{1,2}$, where N1 is a processing time of a PDSCH, and a value of $d_{1,2}$ is related to a physical downlink shared channel (PDSCH) mapping manner.

In another implementation, the determining unit 610 is configured to determine at least one physical uplink control channel (PUCCH) and a plurality of physical uplink shared channels (PUSCH), where the at least one PUCCH and the plurality of PUSCHs at least partially overlap in the time domain; determine PUSCHs fulfilling a constraint condition in the plurality of PUSCHs; and determine a target PUSCH in the PUSCHs fulfilling the constraint condition; and the communications unit 620 is configured to: receive the target PUSCH, and multiplex uplink control information carried in the at least one PUCCH in the target PUSCH for transmission. The constraint condition is any constraint condition in the foregoing wireless communications methods.

In at least one implementation, the target PUSCH is an earliest PUSCH of the PUSCHs fulfilling the constraint condition.

In at least one implementation, the target PUSCH is any PUSCH of the PUSCHs fulfilling the constraint condition.

In another implementation, the determining unit 610 is configured to determine at least one physical uplink control channel (PUCCH) and a plurality of physical uplink shared channels (PUSCH), where the at least one PUCCH and the plurality of PUSCHs at least partially overlap in the time domain, and the at least one PUCCH and the plurality of PUSCHs fulfill a constraint condition; and determine a target PUSCH in the plurality of PUSCHs; and the communications unit 620 is configured to receive the target PUSCH, and multiplex uplink control information carried in the at least one PUCCH in the target PUSCH for transmission. The constraint condition is any constraint condition in the foregoing wireless communications methods.

In at least one implementation, the target PUSCH is an earliest PUSCH of the PUSCHs fulfilling the constraint condition.

In at least one implementation, the target PUSCH is any PUSCH of the PUSCHs fulfilling the constraint condition.

It should be understood that the apparatus implementations and the method implementations correspond to each other, and for a similar description, reference is made to the method implementations. Specifically, the communications device 600 shown in FIG. 14 may correspond to a corresponding body in the method 200 or the method 300 or the method 400 according to the implementations of the present disclosure, and the foregoing and other operations and/or functions of units in the communications device 600 are respectively intended to implement corresponding procedures of the methods in the implementations of the present disclosure. For simplicity, details are not described herein again.

The communications devices of the implementations of the present disclosure are described above from the perspective of functional modules with reference to FIG. 14. It should be understood that the functional modules may be implemented in a hardware form, may be implemented through an instruction in a software form, or may be implemented through a combination of hardware and software modules.

Specifically, the steps of the method implementation of the implementations of the present disclosure may be implemented by using a hardware integrated logic circuit in the processor and/or implemented by using an instruction in a software form. Steps of the methods disclosed with reference to the implementations of the present disclosure may be directly executed and completed by means of a hardware decoding processor, or may be executed and completed by using a combination of hardware and software modules in the decoding processor.

In at least one implementation, the software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing method implementations in combination with hardware of the processor.

For example, in this implementation of the present disclosure, the determining unit 610 shown in FIG. 14 may be implemented by a processor, and the communications unit 620 shown in FIG. 14 may be implemented by a transceiver.

Figure 15:
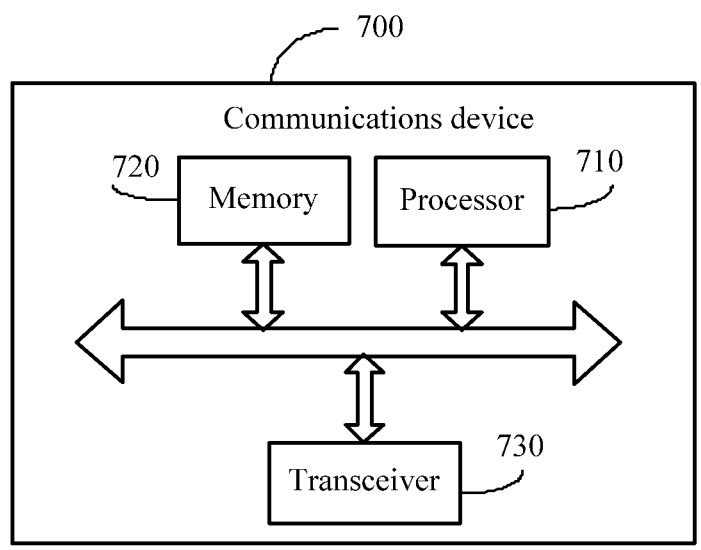
FIG. 15 is another schematic block diagram of a communications device according to an implementation of the present disclosure.

FIG. 15 is a schematic structural diagram of a communications device 700 according to an implementation of the present disclosure. The communications device 700 shown in FIG. 7 includes a processor 710. The processor 710 may invoke a computer program from a memory and run the computer program to implement the method in the implementations of the present disclosure.

In at least one implementation, as shown in FIG. 7, the communications device 700 may further include a memory 720. The memory 720 may be configured to store indication information, and may be further configured to store code, an instruction, or the like executed by the processor 710. The processor 710 may invoke the computer program from the memory 720 and run the computer program, to implement the method in the implementations of the present disclosure.

The memory 720 may be a component independent of the processor 710 or may be integrated into the processor 710.

In at least one implementation, as shown in FIG. 7, the communications device 700 may further include a transceiver 730, and the processor 710 may control the transceiver 730 to communicate with another device and specifically may send information or data to another device or receive information or data sent by another device.

The transceiver 730 may include a transmitter and a receiver. The transceiver 730 may further include one or more antennas.

In at least one implementation, the communications device 700 may be the network device of the implementations of the present disclosure, and the communications device 700 may implement a corresponding process implemented by the network device in each method of the implementations of the present disclosure.

In at least one implementation, the communications device 700 may be the terminal device of the implementations of the present disclosure, and the communications device 700 may implement a corresponding process implemented by the terminal device in each method of the implementations of the present disclosure.

In other words, the communications device 700 according to this implementation of the present disclosure may correspond to the communications device 600 in the implementations of the present disclosure and may correspond to a corresponding body in the method 200 or the method 300 or the method 400 according to the implementations of the present disclosure. For simplicity, details are not described herein again.

It should be understood that components in the communications device 700 are connected to each other through a bus system, where in addition to a data bus, the bus system further includes a power bus, a control bus, and a status signal bus.

Moreover, an implementation of the present disclosure further provides a chip. The chip may be an integrated circuit chip, has a signal processing capability, and can implement or perform various methods, steps, and logical block diagrams disclosed in the implementations of the present disclosure.

In at least one implementation, the chip may be applied to various communications devices, so that a communications device in which the chip is installed can perform various methods, steps, and logical block diagrams disclosed in the implementations of the present disclosure.

Figure 16:
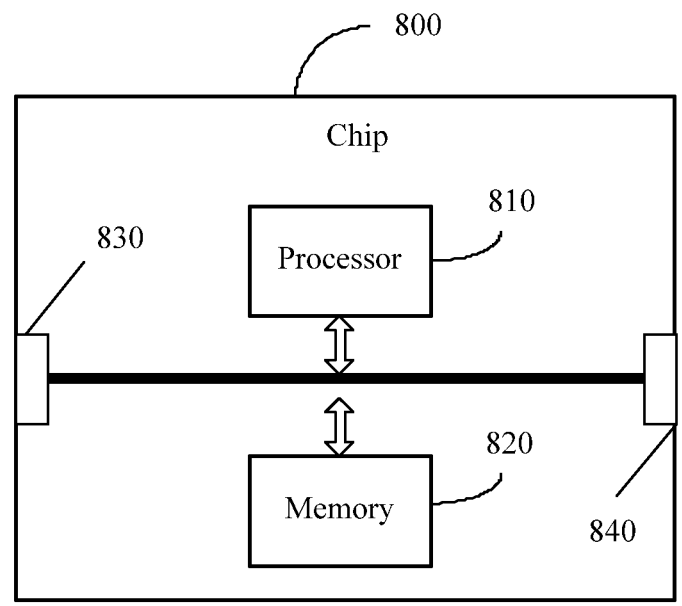
FIG. 16 is a schematic block diagram of a chip according to an implementation of the present disclosure.

FIG. 16 is a schematic structural diagram of a chip according to an implementation of the present disclosure. The chip 800 shown in FIG. 16 includes a processor 810. The processor 810 may invoke a computer program from a memory and run the computer program to implement the method in the implementations of the present disclosure.

In at least one implementation, as shown in FIG. 16, the chip 800 may further include a memory 820. The processor 810 may invoke the computer program from the memory 820 and run the computer program, to implement the method in the implementations of the present disclosure. The memory 820 may be configured to store indication information and may be further configured to store code, an instruction, or the like executed by the processor 810. The memory 820 may be a component independent of the processor 810 or may be integrated into the processor 810.

In at least one implementation, the chip 800 may further include an input interface 830. The processor 810 may control the input interface 830 to communicate with another device or chip, and may specifically obtain information or data sent by the another device or chip.

In at least one implementation, the chip 800 may further include an output interface 840. The processor 810 may control the output interface 840 to communicate with another device or chip, and may specifically output information or data to the another device or chip.

In at least one implementation, the chip may be applied to the network device in the implementations of the present disclosure, and the chip can implement corresponding procedures implemented by the network device in various methods in the implementations of the present disclosure. For brevity, details are not described herein again.

In at least one implementation, the chip may be applied to the terminal device in the implementations of the present disclosure, and the chip can implement corresponding procedures implemented by the terminal device in various methods in the implementations of the present disclosure. For brevity, details are not described herein again.

It should be understood that the chip mentioned in the implementations of the present disclosure may also be referred to as a system-level chip, a system chip, a chip system, a system on chip, or the like. It should be further understood that components of the chip 800 are connected to each other by using a bus system. In addition to including a data bus, the bus system further includes a power bus, a control bus, and a status signal bus.

The processor mentioned in the implementations of the present disclosure may be a general-purpose processor, a digital signal processor (DSP), an application-specific integrated circuit (ASIC), a field-programmable gate array (FPGA), or another programmable logical device, or transistor logical device, or discrete hardware component. Moreover, the general-purpose processor may be a microprocessor or the processor may be any conventional processor and the like.

In addition, it may be understood that the memory mentioned in the implementations of the present disclosure may be a volatile memory or a nonvolatile memory or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM) and is used as an external cache.

It should be understood that the foregoing memory is described as an example other than a limitation. For example, the memory in this implementation of the present disclosure may be further a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), a direct rambus random access memory (DR RAM), or the like. That is, the memory of the systems and methods described in this specification includes but is not limited to those and any memory of another proper type.

Figure 17:
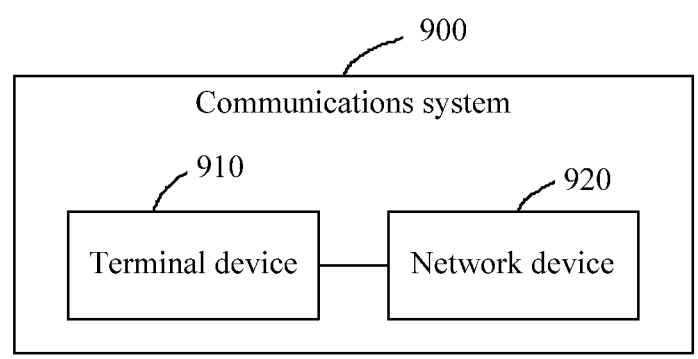
FIG. 17 is a schematic block diagram of a system according to an implementation of the present disclosure.

FIG. 17 is a schematic block diagram of a communications system 900 according to an implementation of the present disclosure. As shown in FIG. 9, the communications system 900 may include a terminal device 910 and a network device 920.

In an implementation, the terminal device 910 is configured to: determine a plurality of uplink channels/signals transmitted within a target time unit; and multiplex, when the plurality of uplink channels/signals fulfill a constraint condition, information carried in the plurality of uplink channels/signals in one channel/signal within the target time unit for transmission, where the plurality of uplink channels/signals at least partially overlap in the time domain; and the network device 920 is configured to determine the plurality of uplink channels/signals; and receive one channel/signal within the target time unit when the plurality of uplink channels/signals fulfill the constraint condition. The constraint condition includes: a first symbol of an earliest uplink channel/signal of the plurality of uplink channels/signals is not before an $A^{th}$ symbol after a start time or after a last symbol of a target channel/signal, where A is a non-negative integer.

In another implementation, the terminal device 910 is configured to: receive at least one piece of downlink control information (DCI); determine a plurality of uplink channels/signals transmitted within a target time unit, where the plurality of uplink channels/signals at least partially overlap in time domain, and the at least one piece of DCI is used for indicating at least one uplink channel/signal of the plurality of uplink channels/signals; and multiplex, when the plurality of uplink channels/signals fulfill a constraint condition, information carried in the plurality of uplink channels/signals in one channel/signal within the target time unit for transmission; and the network device 920 is configured to: send the at least one piece of DCI to the terminal device 910; determine the plurality of uplink channels/signals; and receive one channel/signal within the target time unit when the plurality of uplink channels/signals fulfill the constraint condition, where the constraint condition includes: a first symbol of an earliest uplink channel/signal of the plurality of uplink channels/signals is not before an $A^{th}$ symbol after a last symbol of a physical downlink control channel (PDCCH) carrying the at least one piece of DCI, where A is a non-negative integer.

In another implementation, the terminal device 910 is configured to: determine at least one physical uplink control channel (PUCCH) and a plurality of physical uplink shared channels (PUSCH), where the at least one PUCCH and the plurality of PUSCHs at least partially overlap in time domain; determine PUSCHs fulfilling a constraint condition in the plurality of PUSCHs; determine a target PUSCH in the PUSCHs fulfilling the constraint condition; and transmit, by using the target PUSCH, uplink control information carried in the at least one PUCCH, where the constraint condition is any constraint condition related to the foregoing; and the network device 920 is configured to: determine the at least one PUCCH and the plurality of PUSCHs, where the at least one PUCCH and the plurality of PUSCHs at least partially overlap in time domain; determine PUSCHs fulfilling a constraint condition in the plurality of PUSCHs; determine a target PUSCH in the PUSCHs fulfilling the constraint condition; and receive the target PUSCH.

In another implementation, the terminal device 910 is configured to determine at least one physical uplink control channel (PUCCH) and a plurality of physical uplink shared channels (PUSCH), where the at least one PUCCH and the plurality of PUSCHs at least partially overlap in the time domain, and the at least one PUCCH and the plurality of PUSCHs fulfill a constraint condition; determine a target PUSCH in the plurality of PUSCHs; and transmit, by using the target PUSCH, uplink control information carried in the at least one PUCCH, where the constraint condition is any constraint condition related to the foregoing; and the network device 920 is configured to determine the at least one PUCCH and the plurality of PUSCHs; determine a target PUSCH in the plurality of PUSCHs; and receive the target PUSCH.

The terminal device 910 may be configured to implement a corresponding function, implemented by the terminal device, in the foregoing methods 200 to 400, and the composition of the terminal device 910 may be shown as that of the communications device 600 shown in FIG. 14 or the communications device 700 shown in FIG. 15. For brevity, details are not described herein again.

The network device 920 may be configured to implement a corresponding function, implemented by the network device, in the foregoing methods xx to xx, and the composition of the network device 920 may be shown as that of the communications device 600 shown in FIG. 14 or the communications device 700 shown in FIG. 15. For brevity, details are not described herein again.

It should be noted that a term "system" or the like in this specification may also be referred to as a "network management architecture," a "network system" or the like.

It should be further understood that the terms used in the implementations and the appended claims of the present disclosure are merely for describing specific implementations, but are not intended to limit the implementations of the present disclosure.

For example, the terms "a," "said," "foregoing" and "the" of singular forms used in the implementations and the appended claims of the present disclosure are also intended to include plural forms, unless otherwise specified in the context clearly.

A person skilled in the art may be aware that, in combination with the examples described in the implementations disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the implementations of the present disclosure.

When the functional units are implemented in the form of a software functional module and sold or used as an independent product, the functional units may be stored in a computer-readable storage medium. Based on such an understanding, the technical solutions of the implementations of the present disclosure essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the implementations of the present disclosure. The foregoing storage medium includes any medium that can store program codes, such as a USB flash disk, a removable hard disk, a read-only memory, a random-access memory, a magnetic disk, or an optical disk.

It may be clearly understood by a person skilled in the art that, for the purpose of convenience and brief description, for a detailed working process of the foregoing system, apparatus, and unit, refer to a corresponding process in the foregoing method implementations, and details are not described herein again.

In the several implementations provided in the present disclosure, it should be understood that the disclosed system, apparatus, and method may be implemented in other manners.

For example, the unit or module or component division in the foregoing apparatus implementation is merely logical function division and may be other division in actual implementation. For example, a plurality of units or modules or components may be combined or integrated into another system, or some units or modules or components may be ignored or not performed.

For another example, the units/modules/components described as separate/display parts may or may not be physically separate, and may be located in one position, or may be distributed on a plurality of network units. Some or all of the units/modules/components may be selected according to actual needs to achieve the objectives of the implementations of the present disclosure.

Finally, it should be noted that, the displayed or discussed mutual couplings or direct couplings or communication connections may be implemented through some interfaces. The indirect couplings or communication connections between the apparatuses or units may be implemented in electrical, mechanical or other forms.

The foregoing content is merely specific implementations of the implementations of the present disclosure, but is not intended to limit the protection scope of the implementations of the present disclosure. Any variation or replacement readily figured out by a person skilled in the art within the technical scope disclosed in the implementations of the present disclosure shall fall within the protection scope of the implementations of the present disclosure. Therefore, the protection scope of the implementations of the present disclosure shall be subject to the protection scope of the claims.

What is claimed is:

1. A method for wireless communications, comprising:
multiplexing, by a terminal device, uplink control information (UCI) in one uplink channel, wherein multiple uplink channels are overlapping and one of the multiple uplink channels is a physical uplink control channel (PUCCH) carrying the UCI, and a first symbol of an earliest uplink channel among the multiple uplink channels is not before an $N^{th}$ symbol after a last symbol of a downlink channel, and wherein:
responsive to determining that the downlink channel is a physical downlink shared channel (PDSCH) and one of the multiple uplink channels is used for transmitting feedback information corresponding to the PDSCH, a value of N is determined according to a PDSCH processing time N1 and a first parameter a, and a value of a is related to a PDSCH mapping type; and
a determination method of the first parameter a for a PDSCH resource mapping type A is different from a determination method of the first parameter a for a PDSCH resource mapping type B.

2. The method according to claim 1, wherein N=N1+a.

3. The method according to claim 2, wherein the first parameter a is a non-negative integer.

4. The method according to claim 1, wherein responsive to determining that the downlink channel is a physical downlink control channel (PDCCH) carrying downlink control information (DCI), and the DCI corresponds to one of the multiple uplink channels, the value of N is determined according to a physical uplink shared channel (PUSCH) preparation time N2.

5. The method according to claim 4, wherein the downlink channel is the PDCCH carrying the DCI, and the DCI corresponds to one of the multiple uplink channels, N=N2+1.

6. The method according to claim 4, wherein the downlink channel is the PDCCH carrying the DCI, and the DCI corresponds to one of the multiple uplink channels, the value of N is determined according to the PUSCH preparation time N2 and a second parameter b, and a value of b is related to a structure of a demodulation reference signal (DMRS) in the PUSCH.

7. The method according to claim 6, wherein the second parameter b is 0 or 1.

8. The method according to claim 4, wherein the downlink channel is the PDCCH carrying the DCI, and the DCI corresponds to one of the multiple uplink channels, and wherein:
the DCI is used for scheduling one PUSCH among the multiple uplink channels; or
the DCI is used for indicating semi-persistent scheduled (SPS) resource release or scheduling PDSCH, and the corresponding feedback information is transmitted in one PUCCH among the multiple uplink channels.

9. The method according to claim 1, wherein:
the multiple uplink channels are PUCCHs; or
the multiple uplink channels comprise PUCCH and PUSCH.

10. The method according to claim 1, wherein at least one of the multiple uplink channels corresponds to a DCI.

11. The method according to claim 1, further comprising:
determining, by the terminal, it is an error case responsive to determining that the multiple uplink channels do not fulfill a constraint condition, wherein the constraint condition comprises that the first symbol of the earliest uplink channel among the multiple uplink channels is not before the $N^{th}$ symbol after the last symbol of the downlink channel.

12. A terminal device, comprising:
a memory, configured to store instructions; and
a processor, configured to, upon executing the instructions in the memory, multiplex uplink control information (UCI) in one uplink channel, wherein multiple uplink channels are overlapping, one of the multiple uplink channels is a physical uplink control channel (PUCCH) carrying the UCI, and a first symbol of an earliest uplink channel among the multiple uplink channels is not before an $N^{th}$ symbol after a last symbol of a downlink channel, and wherein:
responsive to determining that the downlink channel is a physical downlink shared channel (PDSCH) and one of the multiple uplink channels is used for transmitting feedback information corresponding to the PDSCH, a value of N is determined according to a PDSCH processing time N1 and a first parameter a, and a value of a is related to a PDSCH mapping type; and
a determination method of the first parameter a for a PDSCH resource mapping type A is different from a determination method of the first parameter a for a PDSCH resource mapping type B.

13. The terminal device according to claim 12, wherein N=N1+a.

14. The terminal device according to claim 12, wherein the downlink channel is a PDCCH carrying DCI, and the DCI corresponds to one of the multiple uplink channels, N=N2+1, where N2 is a physical uplink shared channel (PUSCH) preparation time.

15. The terminal device according to claim 12, wherein the downlink channel is a PDCCH carrying DCI, and the DCI corresponds to one of the multiple uplink channels, the value of N is determined according to a PUSCH preparation time N2 and a second parameter b, and a value of b is related to a structure of a demodulation reference signal (DMRS) in the PUSCH.

16. The terminal device according to claim 15, wherein the second parameter b is 0 or 1.

17. The terminal device according to claim 12, wherein the multiple uplink channels are PUCCHs; or
the multiple uplink channels comprise PUCCH and PUSCH.

18. The terminal device according to claim 12, wherein the downlink channel is a PDCCH carrying DCI, and the DCI corresponds to one of the multiple uplink channels, and wherein:
the DCI is used for scheduling one PUSCH among the multiple uplink channels; or
the DCI is used for indicating semi-persistent scheduled (SPS) resource release or scheduling PDSCH, and the corresponding feedback information is transmitted in one PUCCH among the multiple uplink channels.

19. The terminal device according to claim 12, wherein at least one of the multiple uplink channels corresponds to a DCI.

20. The terminal device according to claim 12, wherein the processor is further configured to:
determine it is an error case responsive to determining that the multiple uplink channels do not fulfill a constraint condition, wherein the constraint condition comprises that the first symbol of the earliest uplink channel among the multiple uplink channels is not before the $N^{th}$ symbol after the last symbol of the downlink channel.

* * * * *